(12) United States Patent
Fripp et al.

(10) Patent No.: US 11,613,688 B2
(45) Date of Patent: Mar. 28, 2023

(54) WELLBORE ISOLATION DEVICES WITH DEGRADABLE NON-METALLIC COMPONENTS

(71) Applicant: Halliburton Energy Services, Inc., Houston, TX (US)

(72) Inventors: Michael Linley Fripp, Carrollton, TX (US); Zachary William Walton, Duncan, OK (US)

(73) Assignee: HALLIBURTON ENERGY SEVICES, INC., Houston, TX (US)

( * ) Notice: Subject to any disclaimer, the term of this patent is extended or adjusted under 35 U.S.C. 154(b) by 77 days.

(21) Appl. No.: 16/248,595

(22) Filed: Jan. 15, 2019

(65) Prior Publication Data

US 2019/0144733 A1    May 16, 2019

Related U.S. Application Data

(63) Continuation-in-part of application No. 14/784,829, filed as application No. PCT/US2015/038624 on Jun.
(Continued)

(51) Int. Cl.
*E21B 33/12* (2006.01)
*E21B 33/129* (2006.01)
(Continued)

(52) U.S. Cl.
CPC .............. *C09K 8/426* (2013.01); *C09K 8/428* (2013.01); *C22C 21/00* (2013.01); *C22C 23/02* (2013.01);
(Continued)

(58) Field of Classification Search
CPC .... E21B 33/12; E21B 33/1208; E21B 33/128; E21B 33/1293; E21B 33/1294;
(Continued)

(56) References Cited

U.S. PATENT DOCUMENTS 4,655,852 A    4/1987  Rallis
5,984,007 A    11/1999 Yuan et al.
(Continued)

FOREIGN PATENT DOCUMENTS

CA    2955925 A1    3/2016
CA    2886988 C     8/2017
(Continued)

OTHER PUBLICATIONS

Canadian Office Action from Canadian Patent Application No. 2,955,922; dated Dec. 8, 2017, 3 pages.
(Continued)

*Primary Examiner* — Caroline N Butcher
(74) *Attorney, Agent, or Firm* — Barnes & Thornburg, LLP

(57) ABSTRACT

Wellbore isolation devices, methods of use, and downhole tools and systems comprising the wellbore isolation devices. A wellbore isolation device comprises a component selected from the group consisting of a mandrel, a packer element, a sealing ball, a wedge, a slip, a mule shoe, a wiper element, a wiper body, and any combination thereof; wherein the component comprises a degradable non-metallic material that degrades upon exposure to a wellbore environment; and wherein the degradable non-metallic material is a composite material comprising a non-epoxy matrix material and a reinforcing material.

20 Claims, 3 Drawing Sheets

Related U.S. Application Data 30, 2015, now Pat. No. 10,227,841, which is a continuation of application No. PCT/US2014/053212, filed on Aug. 28, 2014.

(51) Int. Cl.
| | |
|---|---|
| *E21B 34/06* | (2006.01) |
| *E21B 33/128* | (2006.01) |
| *C09K 8/42* | (2006.01) |
| *C22C 21/00* | (2006.01) |
| *C22C 23/02* | (2006.01) |
| *C22C 23/04* | (2006.01) |
| *E21B 43/26* | (2006.01) |
| *E21B 33/134* | (2006.01) |
| *E21B 43/11* | (2006.01) |

(52) U.S. Cl.
CPC .............. *C22C 23/04* (2013.01); *E21B 33/12* (2013.01); *E21B 33/128* (2013.01); *E21B 33/1208* (2013.01); *E21B 33/1293* (2013.01); *E21B 33/1294* (2013.01); *E21B 33/134* (2013.01); *E21B 34/06* (2013.01); *E21B 43/11* (2013.01); *E21B 43/26* (2013.01)

(58) Field of Classification Search
CPC ........ E21B 33/134; E21B 34/06; E21B 43/11; E21B 43/26; C09K 8/426; C09K 8/428; C22C 21/00; C22C 23/02; C22C 23/04
See application file for complete search history.

(56) References Cited

U.S. PATENT DOCUMENTS

| | | | |
|---|---|---|---|
| 7,168,494 B2 | 1/2007 | Starr et al. | |
| 7,350,582 B2 | 4/2008 | McKeachnie et al. | |
| 7,353,879 B2* | 4/2008 | Todd | E21B 33/12 166/376 |
| 7,690,436 B2 | 4/2010 | Turley et al. | |
| 7,789,135 B2 | 9/2010 | Turley et al. | |
| 8,211,248 B2 | 7/2012 | Marya | |
| 8,267,177 B1 | 9/2012 | Vogel et al. | |
| 8,413,727 B2 | 4/2013 | Holmes | |
| 8,573,295 B2 | 11/2013 | Johnson et al. | |
| 8,695,714 B2 | 4/2014 | Xu et al. | |
| 8,746,342 B1 | 6/2014 | Nish et al. | |
| 8,905,147 B2 | 12/2014 | Fripp et al. | |
| 8,955,605 B2 | 2/2015 | VanLue | |
| 9,010,411 B1 | 4/2015 | Van Lue | |
| 9,016,363 B2 | 4/2015 | Xu et al. | |
| 9,217,319 B2 | 12/2015 | Frazier et al. | |
| 9,309,744 B2 | 4/2016 | Frazier | |
| 10,174,578 B2 | 1/2019 | Walton | |
| 2005/0205265 A1* | 9/2005 | Todd | E21B 33/12 166/376 |
| 2006/0131031 A1 | 6/2006 | McKeachnie et al. | |
| 2006/0278405 A1 | 12/2006 | Turley et al. | |
| 2007/0074873 A1 | 4/2007 | McKechnie et al. | |
| 2007/0181224 A1 | 8/2007 | Marya et al. | |
| 2007/0222106 A1 | 9/2007 | Brown | |
| 2008/0149345 A1 | 6/2008 | Marya et al. | |
| 2009/0101352 A1 | 4/2009 | Coronado | |
| 2010/0270031 A1 | 10/2010 | Patel | |
| 2011/0048743 A1 | 3/2011 | Stafford et al. | |
| 2011/0067889 A1* | 3/2011 | Marya | E21B 43/12 166/386 |
| 2011/0132621 A1 | 6/2011 | Agrawal et al. | |
| 2012/0097384 A1 | 4/2012 | Valencia et al. | |
| 2012/0125642 A1 | 5/2012 | Chenault et al. | |
| 2012/0292053 A1 | 11/2012 | Xu et al. | |
| 2012/0318513 A1 | 12/2012 | Mazyar et al. | |
| 2013/0043041 A1 | 2/2013 | McCoy | |
| 2013/0048305 A1 | 2/2013 | Xu et al. | |
| 2013/0112429 A1 | 5/2013 | Crews | |
| 2013/0213665 A1* | 8/2013 | O'Malley | E21B 33/134 166/373 |
| 2013/0240200 A1 | 9/2013 | Frazier | |
| 2013/0292123 A1* | 11/2013 | Murphree | E21B 34/14 166/308.1 |
| 2013/0327540 A1 | 12/2013 | Hamid et al. | |
| 2014/0027128 A1 | 1/2014 | Johnson et al. | |
| 2014/0190685 A1* | 7/2014 | Frazier | E21B 33/1293 166/250.01 |
| 2014/0190705 A1 | 7/2014 | Fripp | |
| 2014/0224477 A1 | 8/2014 | Wiese et al. | |
| 2014/0262327 A1 | 9/2014 | Xu | |
| 2014/0305627 A1 | 10/2014 | Manke | |
| 2015/0053428 A1 | 2/2015 | Xu | |
| 2015/0060085 A1 | 3/2015 | Xu | |
| 2015/0068728 A1 | 3/2015 | Stage | |
| 2015/0247376 A1 | 9/2015 | Tolman | |
| 2015/0285026 A1 | 10/2015 | Frazier | |
| 2015/0354311 A1 | 12/2015 | Okura et al. | |
| 2016/0201427 A1 | 7/2016 | Fripp et al. | |
| 2016/0230498 A1 | 8/2016 | Walton et al. | |
| 2016/0251934 A1 | 9/2016 | Walton et al. | |
| 2016/0290092 A1 | 10/2016 | Doane et al. | |
| 2016/0298412 A1 | 10/2016 | Fripp et al. | |
| 2016/0312111 A1* | 10/2016 | Okura | E21B 23/04 |
| 2017/0016298 A1* | 1/2017 | Takahashi | C08K 3/012 |
| 2017/0030161 A1 | 2/2017 | Frazier | |
| 2017/0201425 A1 | 7/2017 | Marinelli et al. | |
| 2017/0349747 A1 | 12/2017 | Sherman et al. | |

FOREIGN PATENT DOCUMENTS

| | | |
|---|---|---|
| WO | 2005090742 A1 | 9/2005 |
| WO | 2013109287 A1 | 7/2013 |
| WO | 2014100141 A2 | 6/2014 |
| WO | 2015171126 A1 | 11/2015 |
| WO | 2016032493 A1 | 3/2016 |
| WO | 2016032620 A1 | 3/2016 |
| WO | 2016032621 A1 | 3/2016 |
| WO | 2016032761 A1 | 3/2016 |

OTHER PUBLICATIONS

Australian Examination Report from Australian Patent Application No. 2015307211, dated Feb. 5, 2018, 5 pages.
Ginger Gardiner, "Composites boon from hydraulic fracturing?" CompositesWorld, Jan. 8, 2014, XP055267997, obtained from http://www.compositesworld.com/blog/post/composites-boon-from-hydraulic-fracturing.
Search Report received in corresponding Netherlands Application No. 1041449, dated May 17, 2016.
International Search Report and Written Opinion for PCT/US2015/038624 dated Sep. 18, 2015.
International Search Report and Written Opinion for PCT/US2014/053212 dated May 29, 2015.
Canadian Office Action dated Nov. 25, 2021; Canadian Patent Application No. 3,059,575.
Examination Report in CA Application No. 3,059,575, dated May 4, 2022.

* cited by examiner

WELLBORE ISOLATION DEVICES WITH DEGRADABLE NON-METALLIC COMPONENTS

CROSS-REFERENCE TO RELATED APPLICATIONS

This application claims priority to U.S. patent application Ser. No. 14/784,829 filed on Oct. 15, 2015 and entitled "Degradable Wellbore Isolation Devices with Degradable Sealing Balls," which is a US national stage filing of International Patent Application No. PCT/US2015/038624 filed on Jun. 30, 2015, which claims priority to International Patent Application No. PCT/US2014/053212 filed on Aug. 28, 2014 and entitled "Degradable Wellbore Isolation Devices with Large Flow Areas."

BACKGROUND

The present disclosure generally relates to downhole tools used in the oil and gas industry and, more particularly, to wellbore isolation devices having particular non-metallic degradable components.

In the drilling, completion, and stimulation of hydrocarbon-producing wells, a variety of downhole tools are used. For example, it is often desirable to seal portions of a wellbore, such as during fracturing operations when various fluids and slurries are pumped from the surface into a casing string that lines the wellbore, and forced out into a surrounding subterranean formation through the casing string. It thus becomes necessary to seal the wellbore and thereby provide zonal isolation at the location of the desired subterranean formation. Wellbore isolation devices, such as packers, bridge plugs, and fracturing plugs (i.e., "frac" plugs), are designed for these general purposes and are well known in the art of producing hydrocarbons, such as oil and gas. Such wellbore isolation devices may be used in direct contact with the formation face of the wellbore, with a casing string extended and secured within the wellbore, or with a screen or wire mesh.

After the desired downhole operation is complete, the seal formed by the wellbore isolation device must be broken and the tool itself removed from the wellbore. Removing the wellbore isolation device may allow hydrocarbon production operations to commence without being hindered by the presence of the downhole tool. Removing wellbore isolation devices, however, is traditionally accomplished by a complex retrieval operation that involves milling or drilling out a portion of the wellbore isolation device, and subsequently mechanically retrieving its remaining portions. To accomplish this, a tool string having a mill or drill bit attached to its distal end is introduced into the wellbore and conveyed to the wellbore isolation device to mill or drill out the wellbore isolation device. After drilling out the wellbore isolation device, the remaining portions of the wellbore isolation device may be grasped onto and retrieved back to the surface with the tool string for disposal. As can be appreciated, this retrieval operation can be a costly and time-consuming process.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
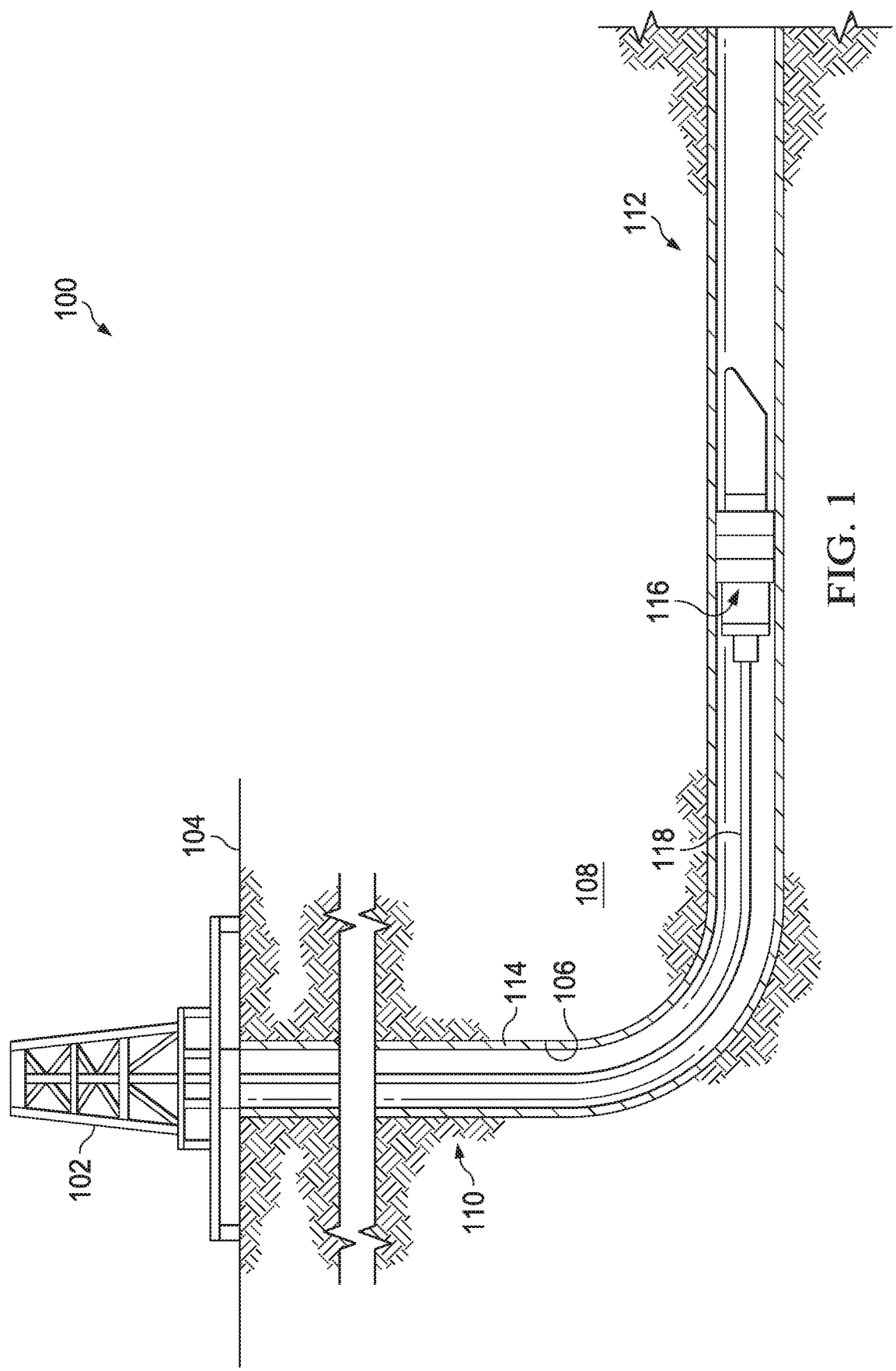
FIG. 1 is a well system that can employ one or more principles of the present disclosure, according to one or more embodiments.

The present disclosure generally relates to downhole tools used in the oil and gas industry and, more particularly, to wellbore isolation devices having particular non-metallic degradable components.

The present disclosure describes embodiments of wellbore isolation devices that are made of slowly degrading materials. In particular, the present disclosure describes wellbore isolation devices having a variety of potential degradable components including a mandrel, a sealing ball, ball cage, wiper elements, wiper body, an expandable or inflatable packer elements, wedges, a mule shoe, slips, etc.; wherein at least some of the components of the wellbore isolation device comprise a degradable non-metallic material which degrades in a wellbore environment. The non-metallic degradable material may comprise an elastomeric material that is degradable in the wellbore environment. In some examples, the non-metallic degradable material may comprise a composite material comprising a degradable elastomeric matrix and a reinforcing material disposed within the elastomeric matrix. The reinforcing material disposed within the elastomeric matrix may or may not be degradable in a wellbore environment. In some alternative examples, the wellbore isolation device may optionally comprise components composed of a slowly degradable metal material (also referred to simply as "degradable metal material") which degrades in a wellbore environment. In some further alternative examples, the wellbore isolation device may comprise a mixture of various types of degradable components, for example, a mixture of degradable non-metallic components and degradable metal components. These degradable materials (also referred to collectively as "degradable substances") are discussed in greater detail below. As used herein, the term "wellbore isolation device," and grammatical variants thereof, is a device that is set in a wellbore to isolate a portion of the wellbore thereabove from a portion therebelow so that fluid can be forced into the surrounding subterranean formation above the device. As used herein, the term "sealing ball," and grammatical variants thereof, refers to a spherical or spheroidal element designed to seal perforations of a wellbore isolation device that are accepting fluid, thereby diverting reservoir treatments to other portions of a target zone. An example of a sealing ball is a frac ball in a frac plug wellbore isolation device. As used herein, the term "packer element" refers to an expandable, inflatable, or swellable element that expands against a casing or wellbore to seal the wellbore.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, businessrelated, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressed in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

The embodiments of the present disclosure are directed toward degradable wellbore isolation devices (e.g., frac plugs, wiper plugs, production isolation plugs, etc.) comprising at least one component (e.g., a mandrel, packer element, mule shoe, slips, wedge, sealing ball, wiper elements, wiper body, etc.) composed of a non-metallic degradable material. As used herein, the term "degradable" and all of its grammatical variants (e.g., "degrade," "degradation," "degrading," "dissolve," dissolving," and the like), refers to the dissolution or chemical conversion of solid materials such that reduced-mass solid end products by at least one of solubilization, hydrolytic degradation, biologically formed entities (e.g., bacteria or enzymes), chemical reactions (including electrochemical and galvanic reactions), thermal reactions, reactions induced by radiation, or combinations thereof. In complete degradation, no solid end products result. In some instances, the degradation of the material may be sufficient for the mechanical properties of the material to be reduced to a point that the material no longer maintains its integrity and, in essence, falls apart or sloughs off into its surroundings. The conditions for degradation are generally wellbore conditions where an external stimulus may be used to initiate or effect the rate of degradation, where the external stimulus is naturally occurring in the wellbore (e.g., pressure, temperature) or introduced into the wellbore (e.g., fluids, chemicals). For example, the pH of the fluid that interacts with the material may be changed by introduction of an acid or a base. The term "wellbore environment" includes both naturally occurring wellbore environments and materials or fluids introduced into the wellbore. The term "at least a portion" with reference to degradation (e.g., "at least a portion of the mandrel is degradable" or "at least a portion of the degradable packer element is degradable," and variants thereof) refers to degradation of at least about 80% of the volume of that part.

Referring to FIG. 1, illustrated is a well system 100 that may embody or otherwise employ one or more principles of the present disclosure, according to one or more embodiments. As illustrated, the well system 100 may include a service rig 102 (also referred to as a "derrick") that is positioned on the earth's surface 104 and extends over and around a wellbore 106 that penetrates a subterranean formation 108. The service rig 102 may be a drilling rig, a completion rig, a workover rig, or the like. In some embodiments, the service rig 102 may be omitted and replaced with a standard surface wellhead completion or installation, without departing from the scope of the disclosure. While the well system 100 is depicted as a land-based operation, it will be appreciated that the principles of the present disclosure could equally be applied in any sea-based or sub-sea application where the service rig 102 may be a floating platform or sub-surface wellhead installation, as generally known in the art.

The wellbore 106 may be drilled into the subterranean formation 108 using any suitable drilling technique and may extend in a substantially vertical direction away from the earth's surface 104 over a vertical wellbore portion 110. At some point in the wellbore 106, the vertical wellbore portion 110 may deviate from vertical relative to the earth's surface 104 and transition into a substantially horizontal wellbore portion 112, although such deviation is not required. That is, the wellbore 106 may be vertical, horizontal, or deviated, without departing from the scope of the present disclosure. In some embodiments, the wellbore 106 may be completed by cementing a string of casing 114 within the wellbore 106 along all or a portion thereof. As used herein, the term "casing" refers not only to casing as generally known in the art, but also to borehole liner, which comprises tubular sections coupled end to end but not extending to a surface location. In other embodiments, however, the string of casing 114 may be omitted from all or a portion of the wellbore 106 and the principles of the present disclosure may equally apply to an "open-hole" environment.

The well system 100 may further include a wellbore isolation device 116 that may be conveyed into the wellbore 106 on a conveyance 118 (also referred to as a "tool string") that extends from the service rig 102. The wellbore isolation device 116 may include or otherwise comprise any type of casing or borehole isolation device known to those skilled in the art including, but not limited to, a frac plug, a deployable baffle, a wellbore packer, a wiper plug, a cement plug, or any combination thereof. The conveyance 118 that delivers the wellbore isolation device 116 downhole may be, but is not limited to, wireline, slickline, an electric line, coiled tubing, drill pipe, production tubing, or the like.

The wellbore isolation device 116 may be conveyed downhole to a target location (not shown) within the wellbore 106. At the target location, the wellbore isolation device may be actuated or "set" to seal the wellbore 106 and otherwise provide a point of fluid isolation within the wellbore 106. In some embodiments, the wellbore isolation device 116 is pumped to the target location using hydraulic pressure applied from the service rig 102 at the surface 104. In such embodiments, the conveyance 118 serves to maintain control of the wellbore isolation device 116 as it traverses the wellbore 106 and provides the necessary power to actuate and set the wellbore isolation device 116 upon reaching the target location. In other embodiments, the wellbore isolation device 116 freely falls to the target location under the force of gravity to traverse all or part of the wellbore 106.

It will be appreciated by those skilled in the art that even though FIG. 1 depicts the wellbore isolation device 116 as being arranged and operating in the horizontal portion 112 of the wellbore 106, the embodiments described herein are equally applicable for use in portions of the wellbore 106 that are vertical, deviated, or otherwise slanted. It should also be noted that a plurality of wellbore isolation devices 116 may be placed in the wellbore 106. In some embodiments, for example, several (e.g., six or more) wellbore isolation devices 116 may be arranged in the wellbore 106 to divide the wellbore 106 into smaller intervals or "zones" for hydraulic stimulation.

Figure 2:
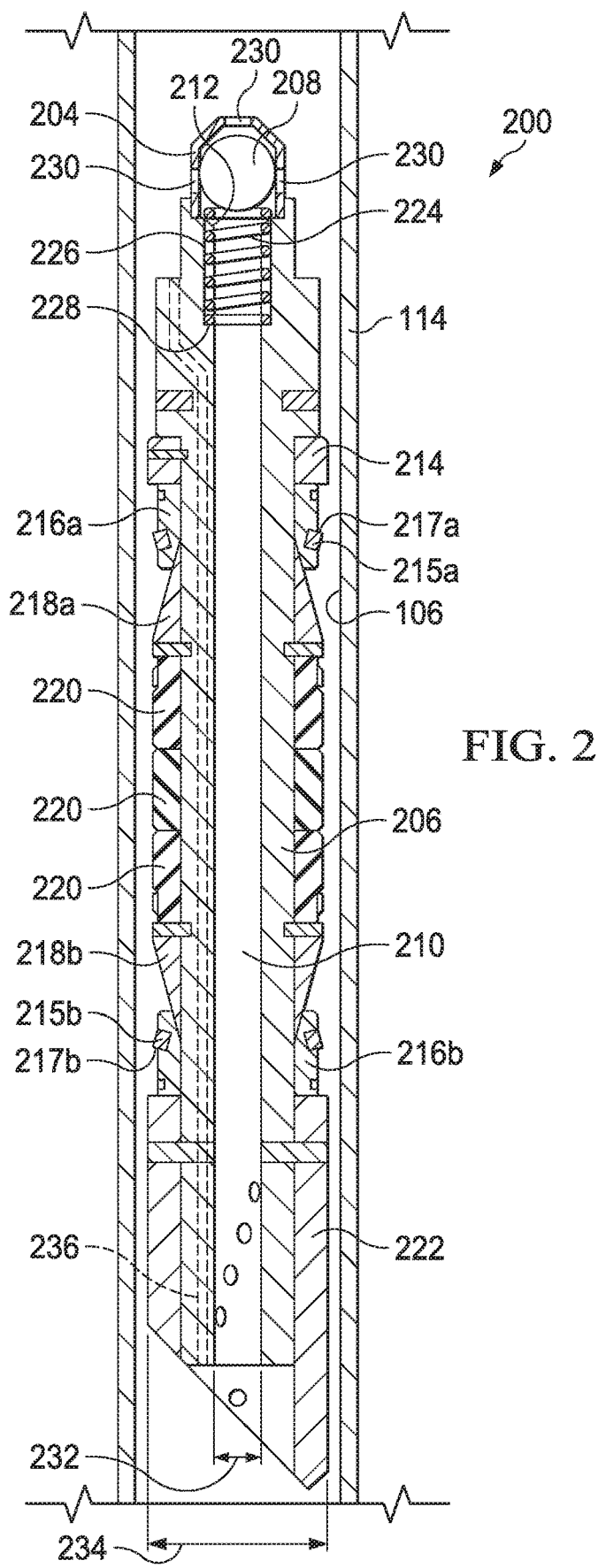
FIG. 2 is a cross-sectional side view of an exemplary frac plug that can employ the principles of the present disclosure.

Referring now to FIG. 2, with continued reference to FIG. 1, illustrated is a cross-sectional view of an exemplary wellbore isolation device 200 that may employ one or more of the principles of the present disclosure, according to one or more embodiments. The wellbore isolation device 200 may be similar to or the same as the wellbore isolation device 116 of FIG. 1. Accordingly, the wellbore isolation device 200 may be configured to be extended into and seal the wellbore 106 at a target location, and thereby prevent fluid flow past the wellbore isolation device 200 for wellbore completion or stimulation operations. In some embodiments, as illustrated, the wellbore 106 may be lined with the casing 114 or another type of wellbore liner or tubing in which the wellbore isolation device 200 may suitably be set. In other embodiments, however, the casing 114 may be omitted and the wellbore isolation device 200 may instead be set or otherwise deployed in an uncompleted or "open-hole" environment.

The wellbore isolation device 200 is generally depicted and described herein as a hydraulic fracturing plug or "frac" plug. It will be appreciated by those skilled in the art, however, that the principles of this disclosure may equally apply to any of the other aforementioned types of casing or borehole isolation devices, without departing from the scope of the disclosure. Indeed, the wellbore isolation device 200 may be any of a frac plug, a bridge plug, a wellbore packer, a deployable baffle, a cement plug, a wiper plug, or any combination thereof in keeping with the principles of the present disclosure. Where a flow passage is provided in the wellbore isolation device 200, as discussed in detail below, the wellbore isolation device 200 may be any of a frac plug, a wellbore packer, a deployable packer, or any combination thereof.

As illustrated, the wellbore isolation device 200 may include a ball cage 204 extending from or otherwise coupled to the upper end of a mandrel 206. A sealing ball 208 (e.g., a frac ball) is disposed in the ball cage 204 and the mandrel 206 defines a longitudinal central flow passage 210. The mandrel 206 also defines a ball seat 212 at its upper end. One or more spacer rings 214 (one shown) may be secured to the mandrel 206 and otherwise extend thereabout. The spacer ring 214 provides an abutment, which axially retains a set of upper slips 216a that are also positioned circumferentially about the mandrel 206. As illustrated, a set of lower slips 216b may be arranged distally from the upper slips 216a. In other embodiments, the sealing ball 208 may be dropped into the conveyance 118 (FIG. 1) to land on top of the wellbore isolation device 200 rather than being carried within the ball cage 204.

One or more slip wedges 218 (shown as upper and lower slip wedges 218a and 218b, respectively) may also be positioned circumferentially about the mandrel 206, and a packer assembly consisting of one or more expandable or inflatable packer elements 220 may be disposed between the upper and lower slip wedges 218a,b and otherwise arranged about the mandrel 206. It will be appreciated that the particular packer assembly depicted in FIG. 2 is merely representative as there are several packer arrangements known and used within the art. For instance, while three packer elements 220 are shown in FIG. 2, the principles of the present disclosure are equally applicable to wellbore isolation devices that employ more or less than three packer elements 220, without departing from the scope of the disclosure.

A mule shoe 222 may be positioned at or otherwise secured to the mandrel 206 at its lower or distal end. As will be appreciated, the lower most portion of the wellbore isolation device 200 need not be a mule shoe 222, but could be any type of section that serves to terminate the structure of the wellbore isolation device 200, or otherwise serves as a connector for connecting the wellbore isolation device 200 to other tools, such as a valve, tubing, or other downhole equipment.

In some embodiments, a spring 224 may be arranged within a chamber 226 defined in the mandrel 206 and otherwise positioned coaxial with and fluidly coupled to the central flow passage 210. At one end, the spring 224 biases a shoulder 228 defined by the chamber 226 and at its opposing end the spring 224 engages and otherwise supports the sealing ball 208. The ball cage 204 may define a plurality of ports 230 (three shown) that allow the flow of fluids therethrough, thereby allowing fluids to flow through the length of the wellbore isolation device 200 via the central flow passage 210.

As the wellbore isolation device 200 is lowered into the wellbore 106, the spring 224 prevents the sealing ball 208 from engaging the ball seat 212. As a result, fluids may pass through the wellbore isolation device 200; i.e., through the ports 230 and the central flow passage 210. The ball cage 204 retains the sealing ball 208 such that it is not lost during translation into the wellbore 106 to its target location. Once the wellbore isolation device 200 reaches the target location, a setting tool (not shown) of a type known in the art can be used to move the wellbore isolation device 200 from its unset position (shown in FIG. 2) to a set position. The setting tool may operate via various mechanisms to anchor the wellbore isolation device 200 in the wellbore 106 including, but not limited to, hydraulic setting, mechanical setting, setting by swelling, setting by inflation, and the like. In the set position, the slips 216a,b and the packer elements 220 expand and engage the inner walls of the casing 114.

When it is desired to seal the wellbore 106 at the target location with the wellbore isolation device 200, fluid is injected into the wellbore 106 and conveyed to the wellbore isolation device 200 at a predetermined flow rate that overcomes the spring force of the spring 224 and forces the sealing ball 208 downwardly until it sealingly engages the ball seat 212. When the sealing ball 208 is engaged with the ball seat 212 and the packer elements 220 are in their set position, fluid flow past or through the wellbore isolation device 200 in the downhole direction is effectively prevented. At that point, completion or stimulation operations may be undertaken by injecting a treatment or completion fluid into the wellbore 106 and forcing the treatment/ completion fluid out of the wellbore 106 and into a subterranean formation above the wellbore isolation device 200.

Following completion and/or stimulation operations, the wellbore isolation device 200 must be removed from the wellbore 106 in order to allow production operations to effectively occur without being excessively hindered by the emplacement of the wellbore isolation device 200. According to the present disclosure, various components of the wellbore isolation device 200 may be made of one or more degrading or dissolving materials. The degrading materials provide more time between setting the wellbore isolation device 200 and when a desired completion or stimulation operation is undertaken, such as a hydraulic fracturing operation. Moreover, some examples of the degrading materials allow for acid treatments and acidified stimulation of the wellbore 106. As will be appreciated, the degrading materials of the present disclosure may be less expensive than other degrading metals and, therefore, the wellbore isolation device 200 may be less expensive overall.

In some examples, it may be desirable that the wellbore isolation device 200 have a greater flow area or flow capacity through and/or around the wellbore isolation device 200. According to the present disclosure, in some embodiments the wellbore isolation device 200 may exhibit a large flow area or flow capacity through and/or around the wellbore isolation device 200 so that it does not unreasonably impede, obstruct, or inhibit production operations while the wellbore isolation device 200 degrades. As a result, production operations may be undertaken while the wellbore isolation device 200 proceeds to dissolve and/or degrade, and without creating a significant pressure restriction within the wellbore 106.

The wellbore isolation device 200 may provide a minimum production flow area across the wellbore isolation device 200. As used herein "production flow area across" the wellbore isolation device 200 refers to any fluid flow through and/or around the wellbore isolation device 200. In some embodiments, the minimum production flow area across the wellbore isolation device 200 may be a desired fraction of the total flow area of the wellbore 106 (i.e., the casing 114) at the location of the wellbore isolation device 200. More particularly, in at least one embodiment, the wellbore isolation device 200 may exhibit a production flow area across the wellbore isolation device 200 that is at least $1/25$ the total flow area of the wellbore 106 (i.e., the casing 114) at the location of the wellbore isolation device 200. In another embodiment, the wellbore isolation device 200 may exhibit a production flow area across the wellbore isolation device 200 that is at least $1/16$ of the total flow area of the wellbore 106 at the location of the wellbore isolation device 200. The production flow area across the wellbore isolation device 200 may include any fluid flow through the central flow passage 210 and any other flow paths through or around the wellbore isolation device 200 that are not necessarily through the central flow passage 210. In some embodiments, for instance, the wellbore isolation device 200 may further include one or more conduits or flow channels 236 defined longitudinally through the mandrel 206 or other structural portions of the wellbore isolation device 200 through which fluids may flow during production operations.

In other embodiments, the minimum production flow area of the wellbore isolation device 200 may correspond to a desired ratio between the inner and outer diameters of the wellbore isolation device 200. The term "diameter" with reference to the minimum production flow area refers to the diameter of the cross-sectional area of the wellbore isolation device 200 or the hydraulic diameter of a flow path (or a combined flow area) through the wellbore isolation device 200. The hydraulic diameter is defined as four times the cross-sectional area divided by the wetted perimeter of the cross section. As illustrated, the wellbore isolation device 200 may exhibit an inner diameter 232 and an outer diameter 234. The inner diameter 232 may generally comprise the diameter of the central flow passage 210, and the outer diameter 234 may comprise the diameter of the wellbore isolation device 200 in the run-in or unexpanded configuration. In at least one embodiment, the inner diameter 232 of the wellbore isolation device 200 may be at least 17% (i.e., $1/6$) of the outer diameter 234 of the wellbore isolation device 200. In another embodiment, the inner diameter 232 of the wellbore isolation device 200 may be at least 25% (i.e., $1/4$) of the outer diameter 234 of the wellbore isolation device 200. The minimum 17% threshold may be calculated from the pressure drop across the wellbore isolation device 200 as a function of the flow rate through the central flow passage 210 in applications having multiple wellbore isolation devices positioned within the wellbore 106. Having the inner diameter 232 greater than 17% of the outer diameter 234 may increase the production flow area through the central flow passage 210 and thereby provide a lower pressure drop across the wellbore isolation device 200. The upper limit of the inner diameter 232 may be dependent on the structural limitations of the wellbore isolation device 200 and, more particularly, the structural limitations of the mandrel 206. For instance, the inner diameter 232 may be any diameter as long as the mandrel 206 remains able to adequately hold or maintain pressure loads that may be assumed during downhole operation.

In yet other embodiments, the minimum production flow area of the wellbore isolation device 200 may need to be larger than the aforementioned two options. With a larger number of wellbore isolation devices, with higher production flow rates, or with lower acceptable pressure drop, the minimum production flow area should be larger to achieve a lower pressure drop of the fluid across the wellbore isolation device 200. In these cases, the fraction of the total flow area should be larger, or the inner diameter 232 of the wellbore isolation device 200 should be a higher fraction of the outer diameter 234. For example, in at least one embodiment, a large number of wellbore isolation devices (e.g., greater than twenty-nine) may be required. In such embodiments, the minimum production flow area of the wellbore isolation device 200 may be achieved by having a production flow area through and/or around the wellbore isolation device 200 that is at least $1/9$ of the total flow area of the wellbore 106 (i.e., the casing 114) at the location of the wellbore isolation device 200, or where the inner diameter 232 of the wellbore isolation device 200 is at least 33% (i.e., $1/3$) of the outer diameter 234. In another embodiment, an even larger number of wellbore isolation devices (e.g., greater than forty-nine) may be required for a specific application. In such embodiments, the minimum production flow area of the wellbore isolation device 200 may be achieved by having a production flow area through and/or around the wellbore isolation device 200 that is at least $1/6$ of the total flow area of the wellbore 106 at the location of the wellbore isolation device 200, or where the inner diameter 232 of the wellbore isolation device 200 is at least 41% of the outer diameter 234.

According to the present disclosure, at least some of the components of the wellbore isolation device 200 comprise non-metallic degradable materials. For example, the mandrel 206, the sealing ball 208, the upper and lower slips 216a,b, the upper and lower slip wedges 218a,b, the mule shoe 222, and/or the packer element 220, may be made of or otherwise comprise a degradable non-metallic material configured to degrade or dissolve within a wellbore environment. In some optional examples, the wellbore isolation device 200 may also comprise components are made of or otherwise comprise a degradable metal material including, but not limited to, the mandrel 206, the sealing ball 208, the upper and lower slips 216a,b, the upper and lower slip wedges 218a,b, and the mule shoe 222. In addition to the foregoing, other components of the wellbore isolation device 200 that may be made of or otherwise comprise a degradable metal material include extrusion limiters and shear pins associated with the wellbore isolation device 200. The foregoing structural elements or components of the wellbore isolation device 200 are collectively referred to herein as "the components" in the following discussion. In some embodiments, as discussed below, the mandrel 206, the sealing ball 208, the upper and lower slips 216a,b, the upper and lower slip wedges 218a,b, and the mule shoe 222 may be composed of a degradable metal material, a degradable non-metallic material, a degradable glass material, or any combination thereof. In some embodiments, as discussed below, the degradable non-metallic material is a composite material comprising a degradable matrix material. The composite material comprises a reinforcing material that may or may not be degradable. In some embodiments, as discussed in greater detail below, the packer element 220 is composed of a non-degradable or minimally degradable elastomer, or a degradable elastomer. As used herein, the term "minimally degradable" refers to degradation of no more than about 50% by volume of the material in a wellbore environment.

Figure 3:
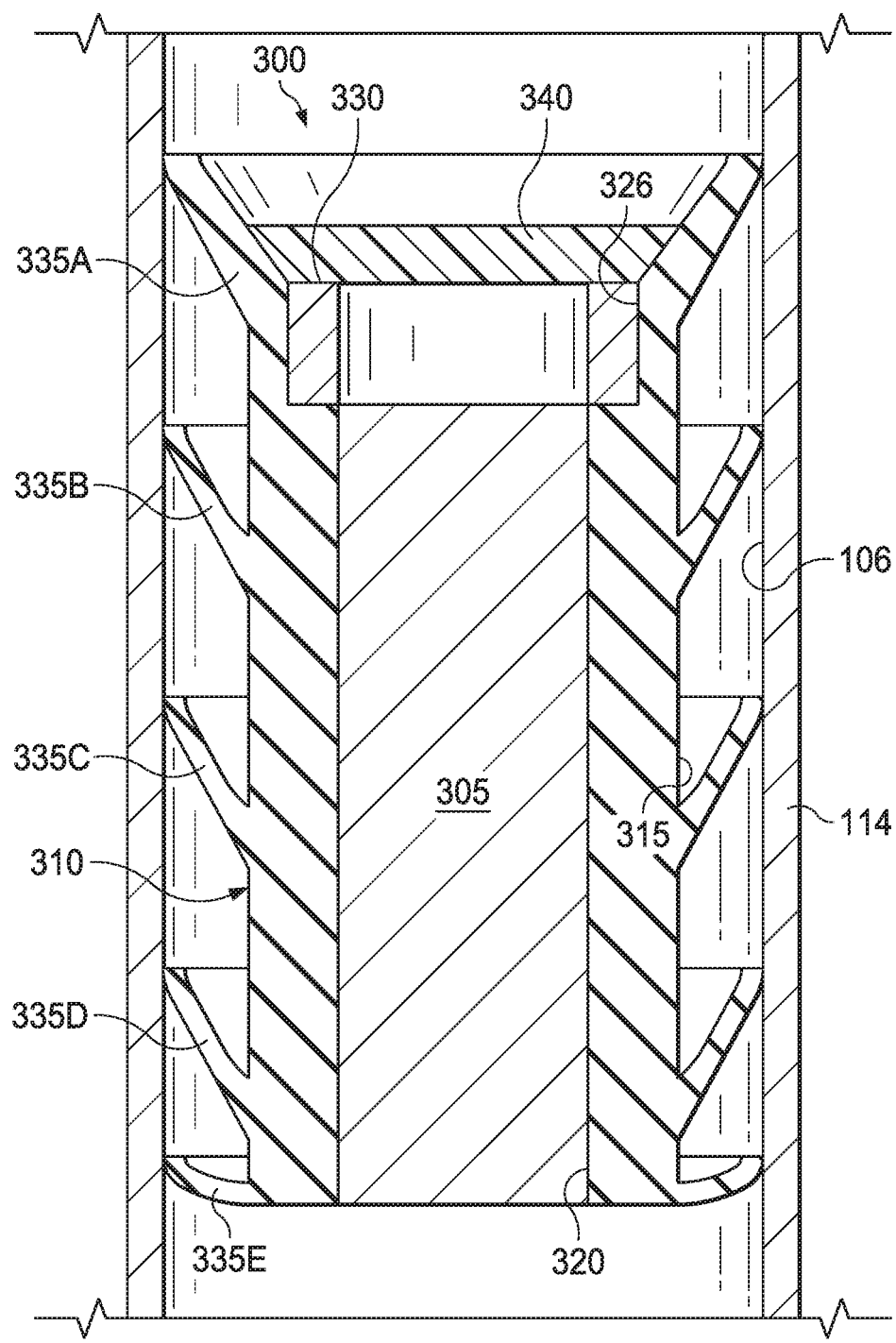
FIG. 3 is a cross-sectional side view of a wiper plug that can employ the principles of the present disclosure, according to one or more embodiments.

FIG. 3 is a cross-sectional side view of a wiper plug 300 which is another type of wellbore isolation device such as the frac plug species of wellbore isolation device 200 that is illustrated in FIG. 2. Analogous to the wellbore isolation device 200 of FIG. 2, the wiper plug 300 comprises a variety of components, any one of which may comprise a degradable material, for example, a degradable non-metallic material, degradable metal material, and/or a degradable glass material.

Wiper plug 300, which may also be referred to as a cementing plug, may be introduced and positioned in a casing 114 disposed in a wellbore 106. Wiper plug 300 comprises a body 305 and a wiper assembly 310 disposed around the body 305. Body 305 may be made of any of the degradable materials described herein and may be a degradable non-metallic material, degradable metal material, or degradable glass material. Wiper assembly 310 may be made of any of the degradable materials described herein and may be a degradable non-metallic material, degradable metal material, or degradable glass material. Wiper assembly 310 may be molded onto the outer surface of the body 305 or otherwise coupled to the body 305. In some examples, body 305 and wiper assembly 310 may comprise a single component Body 305 has a substantially cylindrical configuration with an outer surface 315 and a first bore 320, defined longitudinally therethrough. A larger second bore 325 is defined in the upper end of body 305 such that an upwardly facing annular shoulder 330 is defined between first bore 320 and second bore 325. Thus, a recess is formed in the upper end of the central opening through which a fluid, such as a cement, may pass.

Wiper assembly 310 comprises several wipers 335 of varying shapes, sizes, and geometries. Wiper assembly 310 has an upper first wiper 335A which extends outward radially. Downhole of the upper first wiper 335A are a series of wipers 335B-335D that extend upward and radially outward to form several conical shaped structures around body 305. At the downhole end of wiper plug 300 is a lower wiper 335E which also extends outward radially but at a less acute angle than that of the wipers 335A-335D which may be angled upward much more sharply. The wipers 335 may be made of any degradable material described herein and may be composed of a degradable non-metallic material, degradable metal material, or degradable glass material.

Disposed within second bore 325 and adjacent to annular shoulder 330 is a rupturable structure 340. The rupturable structure may be any structure configured to rupture from impact and/or sufficient applied pressure. Although wiper plug 300 is illustrated as a bottom plug, the wiper plug 300 may also be a top plug and not comprise a rupturable structure 340 and may alternatively comprise a solid body 305 having no throughbore. In either example, the components of the wiper plug 300 may be composed of any of the degradable materials disclosed herein.

The degradable metal material, degradable non-metallic material, and/or degradable glass material (collectively simply "degradable substances") for use in forming components of the wellbore isolation device 200 may degrade, at least in part, in the presence of an aqueous fluid (e.g., a treatment fluid), a hydrocarbon fluid (e.g., a produced fluid in the formation or a treatment fluid), an elevated temperature, and any combination thereof. That is, the degradable substances may wholly degrade or partially degrade. The aqueous fluid that may degrade the degradable substances may include, but is not limited to, fresh water, saltwater (e.g., water containing one or more salts dissolved therein), brine (e.g., saturated salt water), seawater, or combinations thereof. Accordingly, the aqueous fluid may comprise ionic salts. The aqueous fluid may come from the wellbore 106 itself (i.e., the subterranean formation) or may be introduced by a wellbore operator. The hydrocarbon fluid may include, but is not limited to, crude oil, a fractional distillate of crude oil, a fatty derivative of an acid, an ester, an ether, an alcohol, an amine, an amide, or an imide, a saturated hydrocarbon, an unsaturated hydrocarbon, a branched hydrocarbon, a cyclic hydrocarbon, and any combination thereof. The elevated temperature may be above the glass transition temperature of the degradable substance, such as when the degradable elastomer is a thiol-based polymer, or may be a temperature greater than about 60° C. (140° F.).

The degradable substances forming at least a portion of the wellbore isolation device 200 may degrade by a number of mechanisms. For example, the degradable substances may degrade by swelling, dissolving, undergoing a chemical change, undergoing thermal degradation in combination with any of the foregoing, and any combination thereof. Degradation by swell involves the absorption by the degradable substance of a fluid in the wellbore environment such that the mechanical properties of the degradable substance degrade. That is, the degradable substance continues to absorb the fluid until its mechanical properties are no longer capable of maintaining the integrity of the degradable substance and it at least partially falls apart. In some embodiments, a degradable substance may be designed to only partially degrade by swelling in order to ensure that the mechanical properties of the component of the wellbore isolation device 200 formed from the degradable substance is sufficiently capable of lasting for the duration of the specific operation in which it is utilized. Degradation by dissolving involves use of a degradable substance that is soluble or otherwise susceptible to a fluid in the wellbore environment (e.g., an aqueous fluid or a hydrocarbon fluid), such that the fluid is not necessarily incorporated into the degradable substance (as is the case with degradation by swelling), but becomes soluble upon contact with the fluid. Degradation by undergoing a chemical change may involve breaking the bonds of the backbone of the degradable substance (e.g., polymer backbone) or causing the bonds of the degradable substance to crosslink, such that the degradable substance becomes brittle and breaks into small pieces upon contact with even small forces expected in the wellbore environment. Thermal degradation involves a chemical decomposition due to heat, such as the heat present in a wellbore environment. Thermal degradation of some degradable substances described herein may occur at wellbore environment temperatures of greater than about 93° C. (or about 200° F.), or greater than about 50° C. (or about 122° F.). Each degradation method may work in concert with one or more of the other degradation methods, without departing from the scope of the present disclosure.

Referring now to the slowly degradable metal material of the present disclosure, the rate of degradation of the degradable metal material may depend on a number of factors including, but not limited to, the type of degradable metal material selected and the conditions of the wellbore environment. As used herein, a "slowly degradable metal material" (also referred to simply as "degradable metal material" herein) may refer to the rate of dissolution of the degradable metal material, and the rate of dissolution may correspond to a rate of material loss at a particular temperature and within particular wellbore conditions. For instance, in at least one embodiment, a slowly degradable metal material may comprise a material that exhibits a degradation rate in an amount in the range of a lower limit of 0.01 milligrams per square centimeters ($mg/cm^2$) to about 10 $mg/cm^2$ per hour at a temperature of 200° F. (93.3° C.) while exposed to a 15% potassium chloride (KCl) solution, encompassing any value and subset therebetween. For example, the degradation rate may be about 0.01 $mg/cm^2$ to about 2.5 $mg/cm^2$, or about 2.5 $mg/cm^2$ to about 5 $mg/cm^2$, or about 5 $mg/cm^2$ to about 7.5 $mg/cm^2$, or about 7.5 $mg/cm^2$ to about 10 $mg/cm^2$ per hour at a temperature of 200° F. (93.3° C.) while exposed to a 15% potassium chloride (KCl) solution, encompassing any value and subset therebetween. In other instances, a slowly degradable metal material may comprise a material that loses about 0.1% to about 10% of its total mass per day at 200° F. (93.3° C.) in 15% KCl solution, encompassing any value and subset therebetween. For example, in some embodiments the degradable metal material may lose about 0.1% to about 2.5%, or about 2.5% to about 5%, or about 5% to about 7.5%, or about 7.5% to about 10% of its total mass per day at 200° F. (93.3° C.) in 15% KCl solution, encompassing any value and subset therebetween. Each of these values representing the slowly degradable metal material is critical to the embodiments of the present disclosure and may depend on a number of factors including, but not limited to, the type of degradable metal material, the wellbore environment, and the like.

In some embodiments, the degradation rate of the degradable metal material may be somewhat faster, such that the degradable metal material exhibits a degradation rate in an amount of greater than about 10 $mg/cm^2$ per hour at 200° F. (93.3° C.) in 15% KCl solution. In other embodiments, the degradable metal material exhibits a degradation rate such that greater than about 10% of its total mass is lost per day at 200° F. (93.3° C.) in 15% KCl solution.

The degradation of the degradable metal material may be in the range of from about 5 days to about 40 days, encompassing any value or subset therebetween. For example, the degradation may be about 5 days to about 10 days, or about 10 days to about 20 days, or about 20 days to about 30 days, or about 30 days to about 40 days, encompassing any value and subset therebetween. Each of these values representing the slowly degradable metal material is critical to the embodiments of the present disclosure and may depend on a number of factors including, but not limited to, the type of degradable metal material, the wellbore environment, and the like.

The degradable metal materials may be slowly degradable, and typically less expensive than rapidly degrading materials. Thus, the wellbore isolation devices described herein may be less expensive as compared to downhole tools made of rapidly dissolving or degrading materials. The slowly degradable metal materials may allow for more time between setting a wellbore isolation device and when a particular downhole operation is undertaken, such as a hydraulic fracturing treatment operation. Moreover, slowly degradable metal materials allow for acid treatments and acidified stimulation of a wellbore. In some embodiments, the slowly degradable metal materials may require a greater flow area or flow capacity to enable production operations without unreasonably impeding or obstructing fluid flow while the wellbore isolation device degrades. As a result, production operations may be efficiently undertaken while the wellbore isolation device degrades and without creating significant pressure restrictions.

Suitable slowly degradable metal materials that may be used in accordance with the embodiments of the present disclosure include galvanically-corrodible or degradable metals and metal alloys. Such metals and metal alloys may be configured to degrade via an electrochemical process in which the galvanically-corrodible metal corrodes in the presence of an electrolyte (e.g., brine or other salt-containing fluids present within the wellbore 106). As used herein, an "electrolyte" is any substance containing free ions (i.e., a positively or negatively charged atom or group of atoms) that make the substance electrically conductive. The electrolyte can be selected from the group consisting of, solutions of an acid, a base, a salt, and combinations thereof. A salt can be dissolved in water, for example, to create a salt solution. Common free ions in an electrolyte include, but are not limited to, sodium ($Na^+$), potassium ($K^+$), calcium ($Ca^{2+}$), magnesium ($Mg^{2+}$), chloride ($Cl^-$), bromide ($B^-$) hydrogen phosphate ($HPO_4^{2-}$), hydrogen carbonate ($HCO_3^-$), and any combination thereof. Preferably, the electrolyte contains chloride ions. The electrolyte can be a fluid that is introduced into the wellbore 106 or a fluid emanating from the wellbore 106, such as from a surrounding subterranean formation (e.g., the formation 108 of FIG. 1).

Suitable degradable metal materials include, but are not limited to, gold, gold-platinum alloys, silver, nickel, nickel-copper alloys, nickel-chromium alloys, copper, copper alloys (e.g., brass, bronze, etc.), chromium, tin, aluminum, aluminum alloys, iron, zinc, magnesium, magnesium alloys, beryllium, any alloy of the aforementioned materials, and any combination thereof.

Suitable magnesium alloys include alloys having magnesium at a concentration in the range of from about 40% to about 99% by weight of the magnesium, encompassing any value and subset therebetween. In some embodiments, the magnesium concentration may be in the range of about 40% to about 99%, 70% to about 98%, and preferably about 80% to about 95% by weight of the magnesium alloy, encompassing any value and subset therebetween. Each of these values is critical to the embodiments of the present disclosure and may depend on a number of factors including, but not limited to, the type of magnesium alloy, the desired degradability of the magnesium alloy, and the like.

Magnesium alloys comprise at least one other ingredient besides the magnesium. The other ingredients can be selected from one or more metals, one or more non-metals, or a combination thereof. Suitable metals that may be alloyed with magnesium include, but are not limited to, lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof.

Suitable non-metals that may be alloyed with magnesium include, but are not limited to, graphite, carbon, silicon, boron nitride, and combinations thereof. The carbon can be in the form of carbon particles, fibers, nanotubes, fullerenes, and any combination thereof. The graphite can be in the form of particles, fibers, graphene, and any combination thereof. The magnesium and its alloyed ingredient(s) may be in a solid solution and not in a partial solution or a compound where inter-granular inclusions may be present. In some embodiments, the magnesium and its alloyed ingredient(s) may be uniformly distributed throughout the magnesium alloy but, as will be appreciated, some minor variations in the distribution of particles of the magnesium and its alloyed ingredient(s) can occur. In other embodiments, the magnesium alloy is a sintered construction.

In some embodiments, the magnesium alloy may have a yield stress in the range of from about 20000 pounds per square inch (psi) to about 50000 psi, encompassing any value and subset therebetween. For example, in some embodiments, the magnesium alloy may have a yield stress of about 20000 psi to about 30000 psi, or about 30000 psi to about 40000 psi, or about 40000 psi to about 50000 psi, encompassing any value and subset therebetween.

Suitable aluminum alloys include alloys having aluminum at a concentration in the range of from about 40% to about 99% by weight of the aluminum alloy, encompassing any value and subset therebetween. For example, suitable magnesium alloys may have aluminum concentrations of about 40% to about 50%, or about 50% to about 60%, or about 60% to about 70%, or about 70% to about 80%, or about 80% to about 90%, or about 90% to about 99% by weight of the aluminum alloy, encompassing any value and subset therebetween. Each of these values is critical to the embodiments of the present disclosure and may depend on a number of factors including, but not limited to, the type of aluminum alloy, the desired degradability of the aluminum alloy, and the like.

The aluminum alloys may be wrought or cast aluminum alloys and comprise at least one other ingredient besides the aluminum. The other ingredients can be selected from one or more any of the metals, non-metals, and combinations thereof described above with reference to magnesium alloys, with the addition of the aluminum alloys additionally being able to comprise magnesium.

Suitable degradable metal materials for use in the embodiments described herein also include micro-galvanic metals or materials, such as solution-structured galvanic materials. An example of a solution-structured galvanic material is a magnesium alloy containing zinc (Zn), where different domains within the alloy contain different percentages of Zn. This leads to a galvanic coupling between these different domains, which causes micro-galvanic corrosion and degradation. Micro-galvanically corrodible magnesium alloys could also be solution structured with other elements such as zinc, aluminum, manganese, nickel, cobalt, calcium, iron, carbon, tin, silver, copper, titanium, rare earth elements, etc. Examples of solution-structured micro-galvanically-corrodible magnesium alloys include ZK60, which includes 4.5% to 6.5% zinc, minimum 0.25% zirconium, 0% to 1% other, and balance magnesium; AZ80, which includes 7.5% to 9.5% aluminum, 0.2% to 0.8% zinc, 0.12% manganese, 0.015% other, and balance magnesium; and AZ31, which includes 2.5% to 3.5% aluminum, 0.5% to 1.5% zinc, 0.2% manganese, 0.15% other, and the balance magnesium. Each of these examples is % by weight of the metal alloy. In some embodiments, "other" may include unknown materials, impurities, additives, and any combination thereof.

In some optional embodiments, a component of the wellbore isolation device 200 composed of a slowly degradable metal material may comprise dissimilar metals that generate a galvanic coupling that either accelerates or decelerates the degradation rate of the component of the wellbore isolation device 200 that is at least partially composed of the degradable substance, whether a degradable metal material or a degradable non-metal material (e.g., a degradable elastomer), such as the packer element 220. As will be appreciated, such embodiments may depend on where the dissimilar metals lie on the galvanic series. In at least one embodiment, a galvanic coupling may be generated by embedding or attaching a cathodic substance or piece of material into an anodic component. For instance, the galvanic coupling may be generated by dissolving aluminum in gallium. A galvanic coupling may also be generated by using a sacrificial anode coupled to the degradable material. In such embodiments, the degradation rate of the degradable metal material may be decelerated until the sacrificial anode is dissolved or otherwise corroded away. In an optional specific example, the mandrel 206 and the sealing ball 208 may both be composed of a degradable metal material, and the mandrel 206 may be a more electronegative material than the sealing ball 208. In such an embodiment, the galvanic coupling between the mandrel 206 and the sealing ball 208 may cause the mandrel 206 to act as an anode and degrade before the sealing ball 208. Once the mandrel 206 has degraded, the sealing ball 208 would dissolve or degrade independently.

In some embodiments, the density of the component of the wellbore isolation device 200 composed of a degradable metal material, as described herein, may exhibit a density that is relatively low. The low density may prove advantageous in ensuring that the wellbore isolation device 200 may can be placed in extended-reach wellbores, such as extended-reach lateral wellbores. As will be appreciated, the more components of the wellbore isolation device 200 composed of the degradable metal material having a low density, the lesser the density of the wellbore isolation device 200 as a whole. In some embodiments, the degradable metal material is a magnesium alloy or an aluminum alloy and may have a density less than 3 $g/cm^3$ or less than 2 $g/cm^3$. In other embodiments where the degradable metal material is a material that is lighter than steel, the density of the may be less than 5 $g/cm^3$. By way of example, the inclusion of lithium in a magnesium alloy can reduce the density of the alloy.

According to the present disclosure, at least one component of the wellbore isolation device 200 comprises a degradable non-metallic material. In a specific example, the packer element 220 of the wellbore isolation device 200 may be composed of an elastomer that is sufficiently resilient (i.e., elastic) to provide a fluid seal between two portions of a wellbore section. In a preferred embodiment, the packer element 220 is composed of a degradable elastomer. It may be desirable that the amount of degradation is capable of causing the packer element 220 to no longer maintain a fluid seal in the wellbore capable of maintaining differential pressure.

The degradation rate of the non-metallic degradable material may be accelerated, rapid, normal, as defined herein. Accelerated degradation may be in the range of from about 2 hours to about 36 hours, encompassing any value or subset therebetween. Rapid degradation may be in the range of from about 36 hours to about 14 days, encompassing any value or subset therebetween. Normal degradation may be in the range of from about 14 days to about 120 days, encompassing any value or subset therebetween. Accordingly, the degradation may be between about 120 minutes to about 120 days. For example, the degradation of the degradable elastomer may be about 2 hours to about 30 days, or about 30 days to about 60 days, or about 60 days to about 90 days, or about 90 days to about 120 days, encompassing any value and subset therebetween. Each of these values is critical and depending on a number of factors including, but not limited to, the type of degradable elastomer selected, the conditions of the wellbore environment, and the like.

The degradable non-metallic material forming at least a portion of the packer 200 may be a material that is at least partially degradable in a wellbore environment. General examples of the degradable non-metallic material include, but are not limited to, a degradable thermoplastic, a degradable thermoset, and degradable elastomeric materials. The elastomeric material may be a degradable thermoplastic or thermosetting material. Specific examples of the degradable non-metallic material include, but are not limited to, a polyurethane rubber (e.g., cast polyurethanes, thermoplastic polyurethanes, polyethane polyurethanes); a polyester-based polyurethane rubber (e.g., lactone polyester-based thermoplastic polyurethanes); a polyether-based polyurethane rubber; a thiol-based polymer (e.g., 1,3,5,-triacryloylhexahydro-1,3,5-triazine); a thiol-epoxy polymer (e.g., having an epoxide functional group, such as bisphenol-A diglycidyl ether, triglycidylisocyanurate, and/or trimethylolpropane triglycidyl ether); a hyaluronic acid rubber; a polyhydroxobutyrate rubber; a polyester elastomer; a polyester amide elastomer; a starch-based resin (e.g., starch-poly(ethylene-co-vinyl alcohol), a starch-polyvinyl alcohol, a starch-polylactic acid, starch-polycaprolactone, starch-poly(butylene succinate), and the like); a polyethylene terephthalate polymer; a polyester thermoplastic (e.g., polyether/ester copolymers, polyester/ester copolymers); a polyglycolic acid polymer; a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly(ε-caprolactone); a poly(hydroxybutyrate); poly(ethyleneoxide); poly(phenyllactide); a poly(amino acid); a poly(orthoester); polyphosphazene; a polylactide; a polyglycolide; a poly(anhydride) (e.g., poly(adipic anhydride), poly(suberic anhydride), poly(sebacic anhydride), poly(dodecanedioic anhydride), poly(maleic anhydride), and poly(benzoic anhydride), and the like); a polyepichlorohydrin; a copolymer of ethylene oxide/polyepichlorohydrin; a terpolymer of epichlorohydrin/ethylene oxide/allyl glycidyl ether; copolymers thereof; terpolymers thereof; and any combination thereof.

In some specific embodiments, the degradable non-metallic material may be a polyurethane rubber, a polyester-based polyurethane rubber, or a polyether-based polyurethane rubber (collectively simply "polyurethane-based rubbers). These polyurethane-based rubbers degrade in water through a hydrolytic reaction, although other degradation methods may also affect the degradability of the polyurethane-based rubbers. As used herein, the term "hydrolytic reaction," and variants thereof (e.g., "hydrolytic degradation") refers to the degradation of a material by cleavage of chemical bonds in the presence of (e.g., by the addition of) an aqueous fluid. Polyurethane-based rubbers traditionally are formed by reacting a polyisocyanate with a polyol. In the embodiments described herein, although non-limiting, the polyol for forming a polyurethane-based rubber may be a natural oil polyol, a polyester polyol (e.g., polybutadienes (e.g., polybutanediol adipate), polycaprolactones, polycarbonates, and the like), or a polyether polyol (e.g., polytetramethylene ether glycol, polyoxypropylene-glycol, polyoxyethylene glycol, and the like). Because polyether polyols are typically hydrolytically more reactive than polyester polyols and natural oil polyols, polyether polyols may be preferred, particularly when the degradation of the degradable elastomer is solely based on aqueous fluid contact and not additionally on other degradation stimuli. However, either polyol may be used to form the polyurethane-based rubber for use as the degradable elastomer described herein, and each is critical to the disclosed embodiments, as the amount of desired degradation over time may depend on a number of factors including the conditions of the subterranean formation, the subterranean formation operation being performed, and the like. Combinations of these polyols may also be used, without departing from the scope of the present disclosure.

Accordingly, the rate of hydrolytic degradation of a polyurethane-based rubber for use as the degradable non-metallic material described herein may be adjusted and controlled based on the order of the polyol addition, as well as the polyol properties and quantities. As an example, in some embodiments, the amount of polyol is included in an amount in the range of from about 0.25 to about 2 stoichiometric ratio of the polyisocyanate in the polyurethane-based rubber, encompassing any value and subset therebetween. For example, the polyol may be included in an amount of about 0.25 to about 0.5, or about 0.5 to about 1, or about 1 to about 1.5, or about 1.5 to about 2 stoichiometric ratio of the polyisocyanate in the polyurethane-based rubber, encompassing any value and subset therebetween. Each of these values is critical to the embodiments described herein and may depend on a number of factors including, but not limited to, the desired hydrolytic degradation rate, the type of polyol(s) selected, the type of subterranean formation being performed, and the like.

In examples where the degradable non-metallic material selected is a polyurethane-based rubber, the inclusion of a low functionality initiator may impart flexibility to thereto. Such low functionality initiators may include, but are not limited to dipropylene glycol, glycerine, sorbitol/water solution, and any combination thereof. As used herein, the term "low functionality initiator," and grammatical variants thereof, refers to the average number of isocyanate reactive sites per molecule of in the range of from about 1 to about 5. These low functionality initiators impart flexibility to the packer element 220 and may be included in the polyurethane-based rubbers described herein in an amount in the range of from about 1% to about 50% by weight of the polyol in the polyurethane-based rubber, encompassing any value and subset therebetween. For example, the low functionality initiator(s) may be included in the polyurethane-based rubbers in an amount of about 1% to about 12.5%, or about 12.5% to about 25%, or about 25% to about 37.5%, or about 37.5% to about 50% by weight of the polyol in the polyurethane-based rubber, encompassing any value and subset therebetween. Additionally, in some embodiments, higher molecular weight polyols for use in forming the polyurethane-based rubbers described herein may impart flexibility to the packer element 220 described herein. For example, in some embodiments, the molecular weight of the selected polyols may be in the range of from about 200 Daltons (Da) to about 20000 Da, encompassing any value and subset therebetween. For example, the molecular weight of the polyols may be about 200 Da to about 5000 Da, or about 5000 Da to about 10000 Da, or about 10000 Da to about 15000 Da, or about 15000 Da to about 20000 Da, encompassing any value and subset therebetween. Each of these values is critical to the embodiments described herein and may depend on a number of factors including, but not limited to, the desired flexibility of the degradable elastomer (and thus, e.g., the packer element 220), the type of subterranean formation operation being performed, the conditions in the subterranean formation, and the like.

In some embodiments, the degradable non-metallic material may be a degradable thermoplastic. General examples include, but are not limited to, degradable aliphatic polyesters. Specific examples include, but are not limited to, polyglycolic acid and polylactic acid. The polyglycolic acid and polylactic acid may be homopolymers or copolymers. For example, the degradable non-metallic material may be a copolymer of polyglycolic acid and polylactic acid; a copolymer of glycolic acid with other hydroxy-, carboxylic acid-, or hydroxycarboxylic acid-containing moieties; a copolymer of lactic acid with other hydroxy-, carboxylic acid-, or hydroxycarboxylic acid-containing moieties; or any combination thereof. Degradation of the degradable thermoplastic may occur via any of the degradation mechanisms disclosed herein. A preferred method of degradation is hydrolysis of the ester linkages.

In some embodiments, the degradable non-metallic material described herein may be formed from a thiol-based polymer. As used herein, the term "thiol" is equivalent to the term "sulfhydryl." The thiol-based polymer may comprise at least one thiol functional group. In some embodiments, the thiol-based polymer may comprise thiol functional groups in the range of from about 1 to about 22, encompassing every value and subset therebetween. For example, the thiol-based polymer may comprise thiol functional groups in an amount of about 1 to about 5, or 5 to about 10, or 10 to about 15, or 15 to about 20, or 20 to about 22, encompassing any value and subset therebetween. In other embodiments, the thiol-based polymer may comprise even a greater number of thiol functional groups. Each of these values is critical to the embodiments of the present disclosure and may depend on a number of factors including, but not limited to, the desired degradation rate, the desired degradation process, and the like.

The thiol-based polymer may be, but is not limited to, a thiol-ene reaction product, a thiol-yne reaction product, a thiol-epoxy reaction product, and any combination thereof. The thiol-based polymers, whether the reaction product of thiol-ene, thiol-yne, or thiol-epoxy, may be referred to herein as generally being the reaction product of a thiol functional group and an unsaturated functional group, and may be formed by click chemistry. The thiol functional group is an organosulfur compound that contains a carbon-bonded sulfhydryl, represented by the formula —C—SH or R—SH, where R represents an alkane, alkene, or other carbon-containing group of atoms.

Thiol-ene reactions may be characterized as the sulfur version of a hydrosilylation reaction. The thiol-ene reaction product may be formed by the reaction of at least one thiol functional group with a variety of unsaturated functional groups including, but not limited to, a maleimide, an acrylate, a norborene, a carbon-carbon double bond, a silane, a Michael-type nucleophilic addition, and any combination thereof. As used herein, the term "Michael-type nucleophilic addition," and grammatical variants thereof, refers to the nucleophilic addition of a carbanion or another nucleophile to an α,β-unsaturated carbonyl compound, having the general structure (O=C)—$C^\alpha$=$C^\beta$—. An example of a suitable thiol-ene reaction product may include, but is not limited to, 1,3,5,-triacryloylhexahydro-1,3,5-triazine. Examples of suitable thiol-ene/silane reaction products that may be used in forming at least a portion of the downhole tool 100 (FIG. 1) or component thereof include, but are not limited to, the following Formulas 1-6:

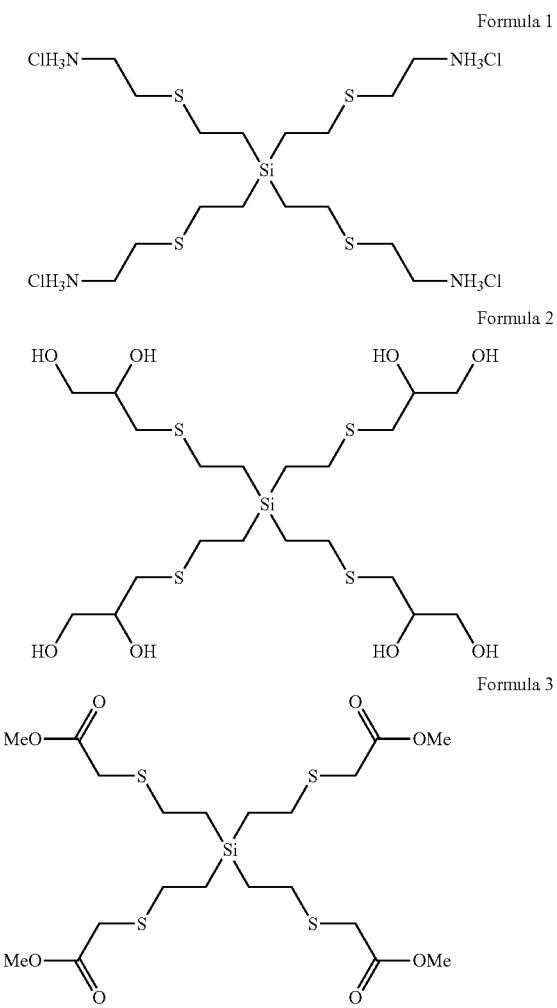

Formula 4

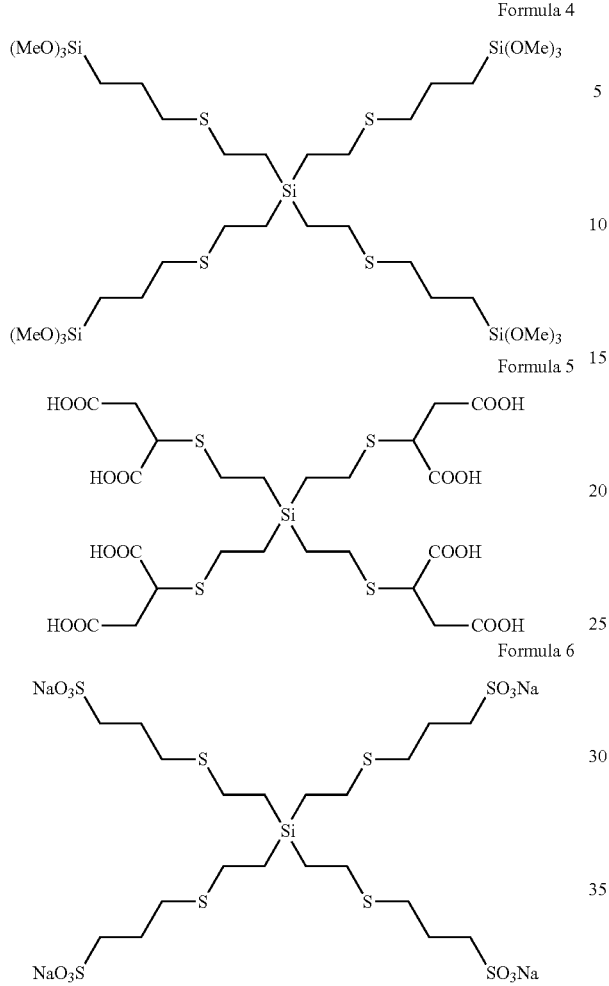

Formula 5

Formula 6

The thiol-yne reaction products may be characterized by an organic addition reaction between a thiol functional group and an alkyne, the alkyne being an unsaturated hydrocarbon having at least one carbon-carbon triple bond. The addition reaction may be facilitated by a radical initiator or UV irradiation and proceeds through a sulfanyl radical species. The reaction may also be amine-mediated, or transition-metal catalyzed.

The thiol-epoxy reaction products may be prepared by a thiol-ene reaction with at least one epoxide functional group. Suitable epoxide functional groups may include, but are not limited to, a glycidyl ether, a glycidyl amine, or as part of an aliphatic ring system. Specific examples of epoxide functional groups may include, but are not limited to, bisphenol-A diglycidyl ether, triglycidylisocyanurate, trimethylolpropane triglycidyl ether, and any combination thereof. The thiol-epoxy reaction products may proceed by one or more of the mechanisms presented below; however, other mechanisms may also be used without departing from the scope of the present disclosure:

Mechanism 1

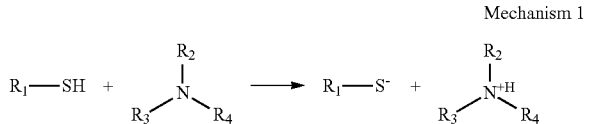

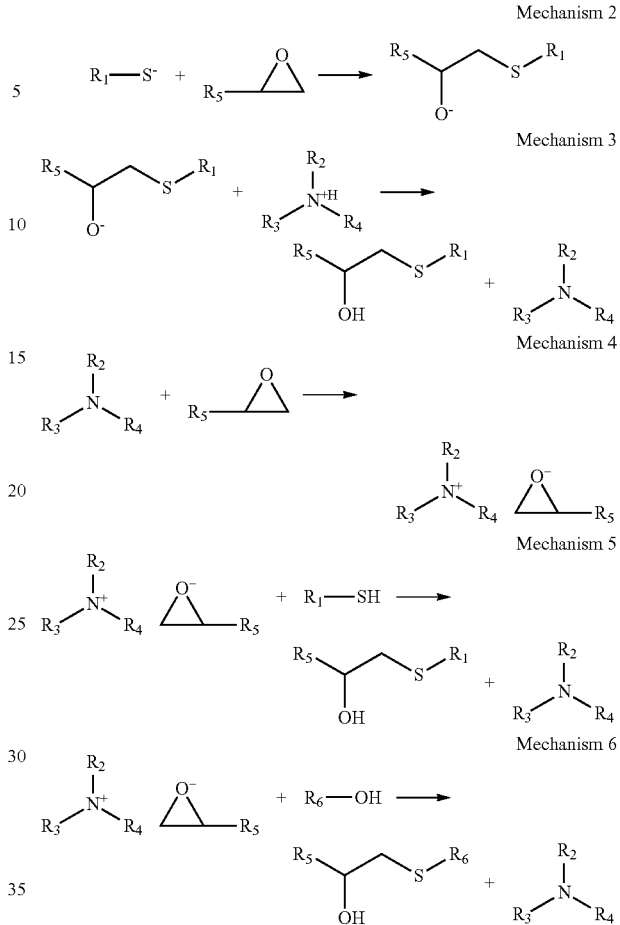

As mentioned above, the thiol-based polymer may comprise at least one thiol functional group and at least one degradable functional group. Such degradable functional groups may include, but are not limited to, one or more of a degradable monomer, a degradable oligomer, or a degradable polymer. Specific examples of degradable functional groups may include, but are not limited to, an acrylate, a lactide, a lactone, a glycolide, an anhydride, a lactam, an allyl, a polyethylene glycol, a polyethylene glycol-based hydrogel, an aerogel, a poly(lactide), a poly(glycolic acid), a poly(vinyl alcohol), a poly(N-isopropylacrylamide), a poly (ε-caprolactone, a poly(hydroxybutyrate), a polyanhydride, an aliphatic polycarbonate, an aromatic polycarbonate, a poly(orthoester), a poly(hydroxyl ester ether), a poly(orthoester), a poly(amino acid), a poly(ethylene oxide), a polyphosphazene, a poly(phenyllactide), a poly(hydroxybutyrate), a dextran, a chitin, a cellulose, a protein, an aliphatic polyester, and any combination thereof.

In some embodiments, the thiol-based polymer comprises at least one polyethylene glycol-based hydrogel, such as one formed by a four-arm polyethylene glycol norbornene that is crosslinked with dithiol containing crosslinkers to form a chemically crosslinked hydrogel to impart swelling properties. The swelling properties of such a hydrogel may vary depending on a number of factors including, but not limited to, network density, the degree of crosslinking, and any combination thereof. In some embodiments, the degree of crosslinking may be desirably increased in order to achieve a higher tensile modulus and reduced swelling percentage.

In some examples, the degradable non-metallic material is a composite material. The composite material comprises a degradable non-metallic matrix and a reinforcing material distributed therein. The reinforcing material may or may not be degradable. The degradable non-metallic matrix may be any degradable non-metallic material disclosed herein, for example, a polyurethane, polyglycolic acid, polylactic acid, a thiol-based polymer, polycaprolactone, polyhydroxyalkanoate, polyhydroxyalkanoiate, polyhydroxybutyrate, polyethylene adipate, polybutylene succinate, poly(lactic-co-glycolic) acid, poly(3-hydroxybutyrate-co-3-hyroxyvalerate, polycarbonate, butyl rubber, natural rubber, styrene-butadiene rubber, ethylene propylene diene terpolymer rubber, acrylic rubber, polyacrylic rubber, and any combination thereof. In one example, the composite material may comprise a degradable non-metallic material and a dispersed reinforcing material wherein the degradable non-metallic material is capable of dissolving via hydrolysis when in contact with an aqueous fluid in wellbore conditions.

The composite material may be formed by any suitable method as will be readily apparent to one of ordinary skill in the art. Examples of suitable methods for forming the composite material include, but are not limited to, molding, casting, extrusion, the like, or any combination thereof. For example, the composite material may be formed by molding wherein the matrix material and the reinforcing material may be combined and compacted within the mold and then melded via any sufficient subsequent processing step. In another example, the composite material may be formed in a single screw extruder or a twin-screw extruder.

In some examples, the matrix material comprises a degradable elastomeric non-metallic material. The elastomeric material may be a thermoplastic elastomer or a thermosetting elastomer. The elastomeric material is preferably an elastomer having a failure strain greater than 50% strain. In an alternative example, the failure strain of the elastomeric material is greater than 100%. Failure strain may be determined by the test method illustrated by ASTM D3039, and the test version corresponding to the filing date of this application. In some examples, it may be preferable to use elastomeric materials as the matrix material as the elastomeric material may have reduced cracking relative to non-elastomeric degradable polymer materials. In some examples, the matrix material may be a non-epoxy material. In another specific example, the composite material does not comprise fiberglass. In an additional specific example, the non-metallic degradable material does not comprise epoxy and/or fiberglass. In a further specific example, the non-metallic degradable material does not comprise a filament wound fiberglass epoxy.

In some examples, the reinforcing material is a non-elastomeric material. In some examples, the failure strain of the composite material may be less than 30%. As such, the failure strain of the composite material may be less than that of the failure of strain of the matrix material.

In some examples, the matrix material may be a hard material. For example, the matrix material may have a hardness in excess of 80 Shore A. In another example, the matrix material may have a hardness in excess of 60 Shore D. In yet another example, the matrix material may have a hardness of 90 Shore D or greater.

The reinforcing material may additionally be included in the composite material to adjust the strength, stiffness, or salt creep resistance of the degradable non-metallic matrix material. The reinforcing material may be a particulate, a fiber, a fiber weaver, or any combination thereof.

The particulate reinforcing material may be of any size suitable for embedding in the composite material. Example particulate sizes include, but are not limited to, sizes in the range of from about 400 mesh to about 40 mesh, U.S. Sieve Series, and encompassing any value or subset therebetween. For example, the size of the particulate reinforcing material may be in the range of about 400 mesh to about 300 mesh, or about 300 mesh to about 200 mesh, or about 200 mesh to about 100 mesh, or about 100 mesh to about 40 mesh, encompassing any value and subset therebetween. Moreover, there is no need for the particulates to be sieved or screened to a particular or specific particle mesh size or particular particle size distribution, but rather a wide or broad particle size distribution can be used, although a narrow particle size distribution is also suitable.

In some embodiments, the particulate reinforcing material may be substantially spherical or non-spherical. Substantially non-spherical particulates may be cubic, polygonal, or any other non-spherical shape. Such substantially non-spherical particulates may be, for example, cubic-shaped, rectangular-shaped, rod-shaped, ellipse-shaped, cone-shaped, pyramid-shaped, planar-shaped, oblate-shaped, or cylinder-shaped. That is, in embodiments wherein the particulates are substantially non-spherical, the aspect ratio of the material may range such that the material is planar to such that it is cubic, octagonal, or any other configuration.

Particulate reinforcing materials suitable for use may include, but are not limited to, organophilic clay, silica flour, metals (e.g. steel, aluminum, magnesium, iron, nickel, titanium, magnesium oxysulfate, eutectic compounds, molybdenum disulfide, etc.), metal oxide, silicates, aluminosilicates, carbon (e.g., carbon nanotubes, carbon fibers, carbon black, graphite, etc.), sand, bauxite, ceramic materials, silicon carbide, alumina, glass materials, polymer materials (e.g., ethylene vinyl acetate, aramid, nylon, polyethylene, acrylic, polyesters, composite materials, etc.), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, minerals (e.g., rocks, aggregate, fly ash, etc.), composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. In some examples, the particulate materials may be treated to enhance bonding with the composite material. For example, a silane-, siloxane-, or amine-based coupling agent may be used. Oxide surfaces may be used to enhance bonding of the reinforcing particulates with the matrix material. Further, intermediate materials, such as metal coatings may be used to enhance bonding of the reinforcing particulates with the matrix material.

The fibers for use as reinforcing agents in the degradable non-metallic material may be of any size and material capable of being included therein. In some embodiments, the fibers may have a length of less than about 2 inches and a width of less than about 0.01 inches. The fiber may have a length-to-diameter ratio of in excess of 5:1. Preferably, the length-to-diameter ratio is in excess of 30:1. Shorter fibers may entangle less frequently and to a lesser degree than longer fibers. Reduced entanglement may be important in some examples as it may reduce the likelihood of an entangled mass of fibers from interfering with a downhole operation after the matric material has dissolved. In some embodiments, a mixture of different sizes of fibers may be used. Suitable fibers may be formed from any material suitable for use as a particulate, as described previously, as well as materials including, but not limited to, carbon fibers, carbon nanotubes, carbon black, graphene, fullerene, a ceramic fiber (e.g., silicon carbide, alumina, etc.), a plastic fiber (e.g., aramid, nylon, polyethylene, acrylic, polyester, etc.), a glass fiber, a metal fiber (e.g., steel, aluminum, magnesium, iron, nickel, titanium, magnesium oxysulfate, eutectic compounds, molybdenum sulfide, etc.), silica fibers (e.g., glass, basalt, aluminosilicates, etc.), natural fibers (e.g., cotton, wool, wood, cellulose, rayon, bamboo, etc.), and any combination thereof. In some embodiments, the fibers may be woven together to form a fiber weave for use in the degradable substance. For example, a steel wool mat of woven cotton fabric may be used. As discussed above, in some examples the fiber reinforcing materials may degrade in the wellbore. The degradation mechanism and/or degradation conditions may be the same or different from the degradation mechanism and/or degradation conditions of the matrix material of the composite material. In some examples, the fibers may be treated to enhance bonding with the composite material. For example, a silane-, siloxane-, or amine-based coupling agent may be used. Oxide surfaces may be used to enhance bonding of the reinforcing fibers with the matrix material. Further, intermediate materials, such as metal coatings may be used to enhance bonding of the reinforcing fibers with the matrix material.

In some embodiments, the volume fraction of the reinforcement material in the composite material may be in the range of from about 1% to about 91%, encompassing any value or subset therebetween. For example, the volume fraction of the reinforcement material may be about 1% to about 25%, or about 25% to about 50%, or about 50% to about 75%, or about 75% to about 91%, encompassing any value or subset therebetween. Each of these values is critical to the embodiments of the present disclosure and may depend on a number of factors including, but not limited to, the desired stiffness of the composite material, the desired strength of the composite material, the desired salt creep resistance of the composite material, the species of matrix selected, the like, and any combination thereof.

In some optional embodiments, the components of the wellbore isolation device 200 may comprise a degradable glass material including, but not limited to, glass polyalkenoate, borate glass polyalkenoate, calcium phosphate glass, polylactic acid/calcium phosphate glass, phosphate glass, silica glass, and any combination thereof. The components of the wellbore isolation device 200 may be any combination of the degradable metal material, the degradable non-metallic material, and/or the degradable glass material, and may additionally comprise an additive such as those discussed below (e.g., thermoplastic addition, reinforcing agent addition, and the like), without departing from the scope of the present disclosure.

Any component of the wellbore isolation device 200 may be composed of the degradable metal material, the degradable non-metallic material, or the degradable glass material described herein. For example, any component of the wellbore isolation device 200 may be a degradable non-metallic material. Therefore, metals, plastics, glass, and the like may all be used to form any component of the wellbore isolation device 200. Generally, the degradable metal material and the degradable glass material are rigid and provide structure, whereas the degradable non-metallic material may be resilient (i.e., elastic), depending on the species of non-metallic material chosen and in the case of the composite material, the species of the reinforcing material may also impact the degree of resiliency.

In a specific example, a wellbore isolation device 200 of a frac plug may comprise a mandrel 206, slip wedges 218a and 218b, and mule shoe 222 made of a degradable non-metallic composite material (e.g., a composite having a polyurethane matrix) and also comprise one or more packer elements 220 composed of a pure (e.g., non-composite) polyurethane.

In another specific example, a wellbore isolation device 116 of a wiper plug 300 may have a body 305 composed of a degradable non-metallic composite material (e.g., a composite having a polyurethane matrix) and wipers 335 composed of a pure (e.g., non-composite) polyurethane.

In yet another specific example, a wellbore isolation device 200 of a frac plug may comprise a mandrel 206, slip wedges 218a and 218b, and mule shoe 222 made of a degradable non-metallic composite material (e.g., a composite having a polyurethane matrix), one or more packer elements 220 composed of a pure (e.g., non-composite) polyurethane, and slips 216a and 216b composed of a degradable metal.

As another specific example, a wellbore isolation device 200 of a frac plug may comprise a sealing ball 208, slip wedges 218a and 218b, and mule shoe 222 made of a degradable non-metallic composite material (e.g., a composite having a polyglycolic acid matrix), one or more packer elements 220 composed of a pure (e.g., non-composite) polyurethane, and mandrel 206 and slips 216a and 216b composed of a degradable metal.

As an additional specific example, a wellbore isolation device 200 of a frac plug may comprise a sealing ball 208, slip wedges 218a and 218b, and mule shoe 222 made of a degradable non-metallic composite material (e.g., a composite having a polyurethane matrix), a mandrel 206 made of a pure non-metallic material (e.g., non-composite of polyglycolic acid), one or more packer elements 220 composed of a pure (e.g., non-composite) polyurethane, and slips 216a and 216b composed of a degradable metal.

In a still further specific example, a wellbore isolation device 200 of a frac plug may comprise a sealing ball 208, slip wedges 218a and 218b, and mule shoe 222 made of a degradable non-metallic material (e.g., polyglycolic acid), a mandrel 206 made of a degradable non-metallic composite material (e.g., a composite having a polyurethane matrix), one or more packer elements 220 composed of a pure (e.g., non-composite) polyurethane, and slips 216a and 216b composed of a degradable glass.

As such, it is to be understood that any of the components of the wellbore isolation device can comprise any of the degradable materials disclosed herein whether the materials are degradable non-metallic materials, degradable metal materials, or degradable glass materials.

In some optional embodiments, the degradable substance(s) forming one or more components of the wellbore isolation device 200 may have a thermoplastic polymer embedded therein, such as in some of the composite material examples discussed above in which a composite material is used as the degradable non-metallic material. In other examples, the thermoplastic may be embedded in a degradable metal or degradable glass material. In still other examples, the thermoplastic may be embedded in the degradable non-metallic material, which may or may not result in the formation of a composite material depending on the manufacturing process selected. In some instances, the degradable elastomer is itself a thermoplastic, in which case a different thermoplastic polymer may be embedded therein, in accordance with the embodiments described herein. The thermoplastic polymer may modify the strength, resiliency, or modulus of a component of the wellbore isolation device 200 (e.g., the packer element 220) and may also control the degradation rate thereof. Suitable thermoplastic polymers may include, but are not limited to, polypropylene, an aliphatic polyester (e.g., polyglycolic acid, polylactic acid, polycaprolactone, polyhydroxyalkanoate, polyhydroxyalkanoiate, polyhydroxybutyrate, polyethylene adipate, polybutylene succinate, poly(lactic-co-glycolic) acid, poly(3-hydroxybutyrate-co-3-hyroxyvalerate, polycarbonate, and the like), and any combination thereof. In some situations, as stated above, the degradable substance may be a thermoplastic, which may be combined with one or more degradable substances (in combination) or a thermoplastic listed above. The amount of thermoplastic polymer that may be embedded in the degradable substance forming may be any amount that confers a desirable quality (e.g., elasticity) without affecting the desired amount of degradation. In some embodiments, the thermoplastic polymer may be included in an amount in the range of from about 1% to about 91% by weight of the degradable substance, encompassing any value or subset therebetween. For example, the thermoplastic polymer may be included in an amount of about 1% to about 25%, or about 25% to about 50%, or about 50% to about 75%, or about 75% to about 91% by weight of the degradable substance, encompassing any value or subset therebetween. Each of these values is critical to the embodiments described herein and may depend on a number of factors including, but not limited to, the desired flexibility of the degradable substance, the desired degradation rate of the degradable substance, the conditions of the subterranean formation, the subterranean formation operation being performed, and the like.

According to an embodiment, the degradable substance may include one or more tracers present therein. The tracer(s) can be, without limitation, radioactive, chemical, electronic, or acoustic. A tracer can be useful in determining real-time information on the rate of dissolution of the degradable substance. By being able to monitor the presence of the tracer, workers at the surface can make on-the-fly decisions that can affect the rate of dissolution of the remaining portions of the wellbore isolation device 200.

In some embodiments, the degradable substance may be at least partially encapsulated in a second material or "sheath" disposed on all or a portion of a given component of the wellbore isolation device 200. The sheath may be configured to help prolong degradation of the given component of the wellbore isolation device 200. The sheath may also serve to protect the component from abrasion within the wellbore 106. The sheath may be permeable, frangible, or comprise a material that is at least partially removable at a desired rate within the wellbore environment. In either scenario, the sheath may be designed such that it does not interfere with the ability of the wellbore isolation device 200 to form a fluid seal in the wellbore 106.

The sheath may comprise any material capable of use in a downhole environment and, depending on the component that the sheath encapsulates, the sheath may or may not be elastic such that it is able to expand with corresponding expansion of the component. For instance, a frangible sheath may break as the packer elements 220 expand to form a fluid seal, whereas a permeable sheath may remain in place on the packer elements 220 as they form the fluid seal. As used herein, the term "permeable" refers to a structure that permits fluids (including liquids and gases) therethrough and is not limited to any particular configuration.

The sheath may comprise any of the aforementioned degradable substances. In some embodiments, the sheath may be made of a degradable substance that degrades at a rate that is faster than that of the underlying degradable substance that forms the component. Other suitable materials for the sheath include, but are not limited to, a TEFLON® coating, a wax, a drying oil, a polyurethane, an epoxy, a cross-linked partially hydrolyzed polyacrylic, a silicate material, a glass, an inorganic durable material, a polymer, polylactic acid, polyvinyl alcohol, polyvinylidene chloride, a hydrophobic coating, paint, and any combination thereof.

In some embodiments, all or a portion of the outer surface of a given component of the wellbore isolation device 200 may be treated to impede degradation. For example, the outer surface of a given component may undergo a treatment that aids in preventing the degradable substance from degrading, or that aids in reducing the degradation rate. Suitable treatments may include, but are not limited to, an anodizing treatment, an oxidation treatment, a chromate conversion treatment, a dichromate treatment, a fluoride anodizing treatment, a hard anodizing treatment, and any combination thereof. As an example, anodizing treatments may result in an anodized layer of material being deposited on the outer surface of a given component. The anodized layer may comprise materials such as, but not limited to, ceramics, metals, polymers, epoxies, elastomers, plastics, or any combination thereof and may be applied using any suitable processes known to those of skill in the art. Examples of suitable processes that result in an anodized layer include, but are not limited to, soft anodized coating, anodized coating, electroless nickel plating, hard anodized coating, ceramic coatings, carbide beads coating, plastic coating, thermal spray coating, high velocity oxygen fuel (HVOF) coating, a nano HVOF coating, a metallic coating.

In some embodiments, all or a portion of the outer surface of a given component of the wellbore isolation device 200 may be treated or coated with a substance configured to enhance degradation of the degradable material. For example, such a treatment or coating may be configured to remove a protective coating or treatment or otherwise accelerate the degradation of the degradable substance of the given component. An example is a galvanically-corroding metal coated with a layer of polyglycolic acid (PGA). In this example, the PGA would undergo hydrolysis and cause the surrounding fluid to become more acidic, which would accelerate the degradation of the underlying metal.

While the foregoing description and embodiments are directed primarily to a degradable or disappearing frac plug, those skilled in the art will readily recognize that the principles of the present disclosure could equally be applied to any traditional wellbore isolation device including, but not limited to, a bridge plug, a wellbore packer, a wiper plug, a cement plug, or any combination thereof. Moreover, while the foregoing description and embodiments are directed primarily to setting wellbore isolation devices within a casing 114 (FIGS. 1 and 2), the principles of the present disclosure are equally applicable to open hole applications.

Embodiments disclosed herein include Embodiment A, Embodiment B, Embodiment C, Embodiment D, Embodiment E, and Embodiment F:

Embodiment A

A downhole tool comprising: a wellbore isolation device that provides a plurality of components including a mandrel, a packer element, and a sealing ball, wherein the mandrel defines a central flow passage that allows fluid flow in at least one direction through the wellbore isolation device, wherein at least a portion of the mandrel is composed of a degradable metal material, at least a portion of the packer element is composed of an elastomer, and at least a portion of the sealing ball is composed of a degradable substance, and wherein the degradable metal material and the degradable substance degrades upon exposure to a wellbore environment.

Embodiment B

A method comprising: introducing a downhole tool into a wellbore, wherein the downhole tool is a wellbore isolation device that provides a plurality of components including a mandrel, a packer element, and a sealing ball, wherein the mandrel defines a central flow passage that allows fluid flow in at least one direction through the wellbore isolation device, and wherein at least a portion of the mandrel is composed of a degradable metal material, at least a portion of the packer element is composed of an elastomer, and at least a portion of the sealing ball is composed of a degradable substance; anchoring the downhole tool within the wellbore at a target location; performing at least one downhole operation; and degrading the degradable metal material and the degradable substance upon exposure to a wellbore environment.

Embodiment C

A system comprising: a conveyance connected to a service rig and extending through a surface into a wellbore in a subterranean formation; and a downhole tool connected to the conveyance and placed in the wellbore, wherein the downhole tool is a wellbore isolation device that provides a plurality of components including a mandrel, a packer element, and a sealing ball, wherein the mandrel defines a central flow passage that allows fluid flow in at least one direction through the wellbore isolation device, wherein at least a portion of the mandrel is composed of a degradable metal material, at least a portion of the packer element is composed of an elastomer, and at least a portion of the sealing ball is composed of a degradable substance, and wherein the degradable metal material and the degradable substance degrades upon exposure to a wellbore environment.

Embodiment D

A wellbore isolation device comprising: a component selected from the group consisting of a mandrel, a packer element, a sealing ball, a wedge, a slip, a mule shoe, a wiper element, a wiper body, and any combination thereof; wherein the component comprises a degradable non-metallic material that degrades upon exposure to a wellbore environment; and wherein the degradable non-metallic material is a composite material comprising a non-epoxy matrix material and a reinforcing material.

Embodiment E

A method comprising: introducing a downhole tool into a wellbore, wherein the downhole tool is a wellbore isolation device comprising at least one component selected from the group consisting of a mandrel, a packer element, a sealing ball, a wedge, a slip, a mule shoe, a wiper element, a wiper body, and any combination thereof; wherein the component comprises a degradable non-metallic material that degrades upon exposure to a wellbore environment; and wherein the degradable non-metallic material is a composite material comprising a non-epoxy matrix material and a reinforcing material. The method further comprises anchoring the downhole tool within the wellbore at a target location; performing at least one downhole operation; and degrading the degradable non-metallic material upon exposure to a wellbore environment.

Embodiment F

A system comprising: a conveyance connected to a service rig and extending through a surface into a wellbore in a subterranean formation; and a downhole tool connected to the conveyance and placed in the wellbore, wherein the downhole tool is a wellbore isolation device comprising at least one component selected from the group consisting of a mandrel, a packer element, a sealing ball, a wedge, a slip, a mule shoe, a wiper element, a wiper body, and any combination thereof; wherein the component comprises a degradable non-metallic material that degrades upon exposure to a wellbore environment; and wherein the degradable non-metallic material is a composite material comprising a non-epoxy matrix material and a reinforcing material.

Each of Embodiments A, B, C, D, E, and F may have one or more of the following additional elements in any combination:

Element 1: Wherein the wellbore isolation device is selected from the group consisting of a frac plug, a wellbore packer, a deployable baffle, and any combination thereof.

Element 2: Wherein the wellbore isolation device is a frac plug and the sealing ball is a frac ball.

Element 3: Wherein the degradable metal material is selected from the group consisting of gold, a gold-platinum alloy, silver, nickel, a nickel-copper alloy, a nickel-chromium alloy, copper, a copper alloy, chromium, tin, aluminum, an aluminum alloy, iron, zinc, magnesium, a magnesium alloy, beryllium, any alloy thereof, and any combination thereof.

Element 4: Wherein the elastomer is minimally degradable such that no more than about 50% by volume of the elastomer degrades in the wellbore environment.

Element 5: Wherein the elastomer is a degradable elastomer that degrades in the presence of the wellbore environment.

Element 6: Wherein the elastomer is a degradable elastomer that degrades in the presence of the wellbore environment, and the wellbore environment is selected from the group consisting of an aqueous fluid, a hydrocarbon fluid, and any combination thereof.

Element 7: Wherein the elastomer is a degradable elastomer that degrades in the presence of the wellbore environment, the degradable elastomer selected from the group consisting of a polyurethane rubber; a polyester-based polyurethane rubber; a polyether-based polyurethane rubber; a thiol-based polymer; a thiol-epoxy polymer; a hyaluronic acid rubber; a polyhydroxobutyrate rubber; a polyester elastomer; a polyester amide elastomer; a starch-based resin; a polyethylene terephthalate polymer; a polyester thermoplastic; a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly($\varepsilon$-caprolactone); a poly(hydroxybutyrate); poly(ethyleneoxide); poly(phenyllactide); a poly(amino acid); a poly(orthoester); polyphosphazene; a polylactide; a polyglycolide; a poly(anhydride); a polyepichlorohydrin; a copolymer of ethylene oxide/polyepichlorohydrin; a terpolymer of epichlorohydrin/ethylene oxide/allyl glycidyl ether; any copolymer thereof; any terpolymer thereof; and any combination thereof.

Element 8: Wherein the degradable substance is selected from the group consisting of a degradable metal material, a degradable elastomer, a degradable glass material, and any combination thereof.

Element 9: Wherein the degradable substance is a degradable metal material selected from the group consisting of gold, a gold-platinum alloy, silver, nickel, a nickel-copper alloy, a nickel-chromium alloy, copper, a copper alloy, chromium, tin, aluminum, an aluminum alloy, iron, zinc, magnesium, a magnesium alloy, beryllium, any alloy thereof, and any combination thereof.

Element 10: Wherein the degradable substance is a degradable metal material and the rate of degradation of the mandrel and the sealing ball is in the range of from about 0.01 mg/cm$^2$ to about 10 mg/cm$^2$ per hour at 200° F. in 15% KCl brine.

Element 11: Wherein the degradable substance is a degradable metal material and the rate of degradation of the mandrel and the sealing ball is greater than about 10 mg/cm$^2$ per hour at 200° F. in 15% KCl brine.

Element 12: Wherein the degradable substance is a degradable metal material and the rate of degradation of the mandrel and the sealing ball is in the range of from about 0.1% to about 10% loss of total mass per day at 200° F. in 15% KCl brine.

Element 13: Wherein the degradable substance is a degradable metal material and the rate of degradation of the mandrel and the sealing ball is greater than about 10% loss of total mass per day at 200° F. in 15% KCl brine.

Element 14: Wherein the degradable substance is a degradable elastomer selected from the group consisting of a polyurethane rubber; a polyester-based polyurethane rubber; a polyether-based polyurethane rubber; a thiol-based polymer; a thiol-epoxy polymer; a hyaluronic acid rubber; a polyhydroxobutyrate rubber; a polyester elastomer; a polyester amide elastomer; a starch-based resin; a polyethylene terephthalate polymer; a polyester thermoplastic; a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly(ε-caprolactone); a poly(hydroxybutyrate); poly(ethyleneoxide); poly(phenyllactide); a poly(amino acid); a poly(orthoester); polyphosphazene; a polylactide; a polyglycolide; a poly(anhydride); a polyepichlorohydrin; a copolymer of ethylene oxide/polyepichlorohydrin; a terpolymer of epichlorohydrin/ethylene oxide/allyl glycidyl ether; any copolymer thereof; any terpolymer thereof; and any combination thereof.

Element 15: Wherein the degradable substance is a degradable glass material selected from the group consisting of a glass polyalkenoate, borate glass polyalkenoate, calcium phosphate glass, polylactic acid/calcium phosphate glass, phosphate glass, silica glass, and any combination thereof.

Element 16: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof.

Element 17: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof, and wherein the flow area across the wellbore isolation device includes any fluid flow area through the central flow passage and through any other flow paths through or around the wellbore isolation device.

Element 18: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof, wherein the flow area across the wellbore isolation device includes any fluid flow area through the central flow passage and through any other flow paths through or around the wellbore isolation device, and wherein the other flow paths comprise at least one flow channel defined longitudinally through the mandrel through which fluids may flow.

Element 19: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof, and wherein the inner diameter comprises a diameter of the central flow passage, and the outer diameter comprises a diameter of the wellbore isolation device in an unexpanded configuration.

Element 20: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof, and wherein first flow area across the wellbore isolation device is at least 1/9 of the total flow area of the casing at the location of the wellbore isolation device within the wellbore and the second flow area results from the inner diameter being at least 33% of the outer diameter.

Element 21: Wherein the matrix material comprises a polyurethane rubber; a polyester-based polyurethane rubber; a polyether-based polyurethane rubber; a thiol-based polymer; a thiol-epoxy polymer; a hyaluronic acid rubber; a polyhydroxobutyrate rubber; a polyester elastomer; a polyester amide elastomer; a starch-based resin; a polyethylene terephthalate polymer; a polyester thermoplastic; a polyglycolic acid polymer; a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly(ε-caprolactone); a poly(hydroxybutyrate); poly(ethyleneoxide); poly(phenyllactide); a poly(amino acid); a poly(orthoester); polyphosphazene; a polylactide; a polyglycolide; a poly(anhydride); a polyepichlorohydrin; a copolymer of ethylene oxide/polyepichlorohydrin; a terpolymer of epichlorohydrin/ethylene oxide/allyl glycidyl ether; copolymers thereof; terpolymers thereof; or any combination thereof.

Element 22: Wherein the matrix material is an elastomer.

Element 23: Wherein the reinforcing material is a particulate material selected from the group consisting of organophilic clay, silica flour, metals, metal oxide, silicates, aluminosilicates, carbon, sand, bauxite, ceramic materials, silicon carbide, alumina, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, minerals, composite particulates, and any combination thereof.

Element 24: Wherein the reinforcing material is a fiber material selected from the group consisting of carbon fibers, carbon nanotubes, carbon black, graphene, fullerene, a ceramic fiber, a plastic fiber, a glass fiber, a metal fiber, silica fibers, natural fibers, and any combination thereof.

Element 25: Wherein the fiber has a length-to-diameter ratio in excess of 5:1.

Element 26: Wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable metal material.

Element 27: Wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable metal material; wherein the wellbore isolation device comprises a third component selected from the group consisting of a mandrel, a packer element, a sealing ball, a wedge, a slip, a mule shoe, a wiper element, a wiper body, and any combination thereof; wherein the third component comprises a degradable elastomer.

Element 28: Wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the degradable non-metallic material is a first degradable non-metallic material; wherein the second component comprises a second degradable non-metallic material; wherein the second degradable non-metallic material is a non-composite material.

Element 29: Wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable glass material.

Element 30: Wherein the non-epoxy matrix material comprises polyglycolic acid; and wherein the reinforcing material comprises a glass fiber having a length of about two inches or less.

By way of non-limiting example, exemplary combinations applicable to Embodiment A, B, C, D, E, and/or F include: 1, 3, 7, and 18; 1 and 2; 1, 15, 19, and 20; 4, 6, 7, and 11; 13, 14, 17, and 19; 1, 2, 3, 4, 5, 6, 7, 8, 9, 10, 11, 12, 13, 14, 15, 16, 17, 18, 19, and 20; 5, 9, 13, 14, and 15; 11, 12, and 20; 5, 8, 10, 16, and 18; 21, 23, and 24; 21, 22, 23, and 24; 21, 23, 24, and 25; 21, 22, 23, and 24; 21, 23, 24, and 30; 21, 23, 24, 25, and 30; 21, 23, 24, and 26; 21, 22, 23, 24, and 26; 21, 23, 24, 25, and 26; 21, 22, 23, 24, and 26; 21, 23, 24, 26, and 30; 21, 23, 24, 25, 26, and 30; 21, 23, 24, and 27; 21, 22, 23, 24, and 27; 21, 23, 24, 25, and 27; 21, 22, 23, 24, and 27; 21, 23, 24, 27, and 30; 21, 23, 24, 25, 27, and 30; 21, 23, 24, and 28; 21, 22, 23, 24, and 28; 21, 23, 24, 25, and 28; 21, 22, 23, 24, and 28; 21, 23, 24, 28, and 30; 21, 23, 24, 25, 28, and 30; 21, 23, 24, and 29; 21, 22, 23, 24, and 29; 21, 23, 24, 25, and 29; 21, 22, 23, 24, and 29; 21, 23, 24, 29, and 30; 21, 23, 24, 25, 29, and 30; 16, 21, 23, and 24; 16, 21, 22, 23, and 24; 16, 21, 23, 24, and 25; 16, 21, 22, 23, and 24; 16, 21, 23, 24, and 30; 16, 21, 23, 24, 25, and 30; 16, 21, 23, 24, and 26; 16, 21, 22, 23, 24, and 26; 16, 21, 23, 24, 25, and 26; 16, 21, 22, 23, 24, and 26; 16, 21, 23, 24, 26, and 30; 16, 21, 23, 24, 25, 26, and 30; 16, 21, 23, 24, and 27; 16, 21, 22, 23, 24, and 27; 16, 21, 23, 24, 25, and 27; 16, 21, 22, 23, 24, and 27; 16, 21, 23, 24, 27, and 30; 16, 21, 23, 24, 25, 27, and 30; 16, 21, 23, 24, and 28; 16, 21, 22, 23, 24, and 28; 16, 21, 23, 24, 25, and 28; 16, 21, 22, 23, 24, and 28; 16, 21, 23, 24, 28, and 30; 16, 21, 23, 24, 25, 28, and 30; 16, 21, 23, 24, and 29; 16, 21, 22, 23, 24, and 29; 16, 21, 23, 24, 25, and 29; 16, 21, 22, 23, 24, and 29; 16, 21, 23, 24, 29, and 30; 16, 21, 23, 24, 25, 29, and 30; 17, 21, 23, and 24; 17, 21, 22, 23, and 24; 17, 21, 23, 24, and 25; 17, 21, 22, 23, and 24; 17, 21, 23, 24, and 30; 17, 21, 23, 24, 25, and 30; 17, 21, 23, 24, and 26; 17, 21, 22, 23, 24, and 26; 17, 21, 23, 24, 25, and 26; 17, 21, 22, 23, 24, and 26; 17, 21, 23, 24, 26, and 30; 17, 21, 23, 24, 25, 26, and 30; 17, 21, 23, 24, and 27; 17, 21, 22, 23, 24, and 27; 17, 21, 23, 24, 25, and 27; 17, 21, 22, 23, 24, and 27; 17, 21, 23, 24, 27, and 30; 17, 21, 23, 24, 25, 27, and 30; 17, 21, 23, 24, and 28; 17, 21, 22, 23, 24, and 28; 17, 21, 23, 24, 25, and 28; 17, 21, 22, 23, 24, and 28; 17, 21, 23, 24, 28, and 30; 17, 21, 23, 24, 25, 28, and 30; 17, 21, 23, 24, and 29; 17, 21, 22, 23, 24, and 29; 17, 21, 23, 24, 25, and 29; 17, 21, 22, 23, 24, and 29; 17, 21, 23, 24, 29, and 30; 17, 21, 23, 24, 25, 29, and 30; 18, 21, 23, and 24; 18, 21, 22, 23, and 24; 18, 21, 23, 24, and 25; 18, 21, 22, 23, and 24; 18, 21, 23, 24, and 30; 18, 21, 23, 24, 25, and 30; 18, 21, 23, 24, and 26; 18, 21, 22, 23, 24, and 26; 18, 21, 23, 24, 25, and 26; 18, 21, 22, 23, 24, and 26; 18, 21, 23, 24, 26, and 30; 18, 21, 23, 24, 25, 26, and 30; 18, 21, 23, 24, and 27; 18, 21, 22, 23, 24, and 27; 18, 21, 23, 24, 25, and 27; 18, 21, 22, 23, 24, and 27; 18, 21, 23, 24, 27, and 30; 18, 21, 23, 24, 25, 27, and 30; 18, 21, 23, 24, and 28; 18, 21, 22, 23, 24, and 28; 18, 21, 23, 24, 25, and 28; 18, 21, 22, 23, 24, and 28; 18, 21, 23, 24, 28, and 30; 18, 21, 23, 24, 25, 28, and 30; 18, 21, 23, 24, and 29; 18, 21, 22, 23, 24, and 29; 18, 21, 23, 24, 25, and 29; 18, 21, 22, 23, 24, and 29; 18, 21, 23, 24, 29, and 30; 18, 21, 23, 24, 25, 29, and 30; 19, 21, 23, and 24; 19, 21, 22, 23, and 24; 19, 21, 23, 24, and 25; 19, 21, 22, 23, and 24; 19, 21, 23, 24, and 30; 19, 21, 23, 24, 25, and 30; 19, 21, 23, 24, and 26; 19, 21, 22, 23, 24, and 26; 19, 21, 23, 24, 25, and 26; 19, 21, 22, 23, 24, and 26; 19, 21, 23, 24, 26, and 30; 19, 21, 23, 24, 25, 26, and 30; 19, 21, 23, 24, and 27; 19, 21, 22, 23, 24, and 27; 19, 21, 23, 24, 25, and 27; 16, 21, 22, 23, 24, and 27; 19, 21, 23, 24, 27, and 30; 19, 21, 23, 24, 25, 27, and 30; 19, 21, 23, 24, and 28; 19, 21, 22, 23, 24, and 28; 19, 21, 23, 24, 25, and 28; 16, 21, 22, 23, 24, and 28; 19, 21, 23, 24, 28, and 30; 19, 21, 23, 24, 25, 28, and 30; 19, 21, 23, 24, and 29; 19, 21, 22, 23, 24, and 29; 19, 21, 23, 24, 25, and 29; 16, 21, 22, 23, 24, and 29; 19, 21, 23, 24, 29, and 30; 19, 21, 23, 24, 25, 29, and 30; 20, 21, 23, and 24; 20, 21, 22, 23, and 24; 20, 21, 23, 24, and 25; 20, 21, 22, 23, and 24; 20, 21, 23, 24, and 30; 20, 21, 23, 24, 25, and 30;

20, 21, 23, 24, and 26; 20, 21, 22, 23, 24, and 26; 20, 21, 23, 24, 25, and 26; 20, 21, 22, 23, 24, and 26; 20, 21, 23, 24, 26, and 30; 20, 21, 23, 24, 25, 26, and 30; 20, 21, 23, 24, and 27; 20, 21, 22, 23, 24, and 27; 20, 21, 23, 24, 25, and 27; 20, 21, 22, 23, 24, and 27; 20, 21, 23, 24, 27, and 30; 20, 21, 23, 24, 25, 27, and 30; 16, 21, 23, 24, and 28; 20, 21, 22, 23, 24, and 28; 20, 21, 23, 24, 25, and 28; 20, 21, 22, 23, 24, and 28; 20, 21, 23, 24, 28, and 30; 20, 21, 23, 24, 25, 28, and 30; 16, 21, 23, 24, and 29; 20, 21, 22, 23, 24, and 29; 20, 21, 23, 24, 25, and 29; 20, 21, 22, 23, 24, and 29; 20, 21, 23, 24, 29, and 30; 20, 21, 23, 24, 25, 29, and 30; and the like Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A wellbore isolation device comprising:
a component selected from the group consisting of a mandrel, a packer element, a wedge, a slip, a mule shoe, a wiper element, a wiper body, and any combination thereof; wherein the component comprises a degradable non-metallic material that degrades upon exposure to a wellbore environment; and wherein the degradable non-metallic material is a composite material comprising a non-epoxy matrix material and a reinforcing material; wherein the non-epoxy matrix material is selected from the group consisting of: a thiol-based polymer; a hyaluronic acid rubber; a polyethylene terephthalate polymer; a polybutylene succinate polymer; a polyhydroxy alkanoic acid polymer; a polybutylene terephthalate polymer; a polyepichlorohydrin; a copolymer of ethylene oxide/polyepichlorohydrin; a terpolymer of epichlorohydrin/ethylene oxide/allyl glycidyl ether; copolymers thereof; terpolymers thereof; and any combination thereof; wherein the reinforcing material is a fiber material selected from the group consisting of carbon black, graphene, fullerene, silica fibers, natural fibers, and any combination thereof; wherein the fiber material is treated with a silane-, siloxane-, or amine-based coupling agent.

2. The wellbore isolation device of claim 1, wherein the matrix material is an elastomer.

3. The wellbore isolation device of claim 1, further comprising a second reinforcing material that is a particulate material selected from the group consisting of organophilic clay, silica flour, metal oxide, silicates, aluminosilicates, carbon, sand, bauxite, ceramic materials, silicon carbide, alumina, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, minerals, composite particulates, and any combination thereof.

4. The wellbore isolation device of claim 1, wherein the fiber has a length-to-diameter ratio in excess of 5:1.

5. The wellbore isolation device of claim 1, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable metal material.

6. The wellbore isolation device of claim 1, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable metal material; wherein the wellbore isolation device comprises a third component selected from the group consisting of a mandrel, a packer element, a sealing ball, a wedge, a slip, a mule shoe, a wiper element, a wiper body, and any combination thereof; wherein the third component comprises a degradable elastomer.

7. The wellbore isolation device of claim 1, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the degradable non-metallic material is a first degradable non-metallic material; wherein the second component comprises a second degradable non-metallic material; wherein the second degradable non-metallic material is a non-composite material.

8. The wellbore isolation device of claim 1, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable glass material.

9. The wellbore isolation device of claim 1, wherein the non-epoxy matrix material comprises a polyethylene terephthalate polymer; and wherein the reinforcing material comprises a glass fiber having a length of about two inches or less.

10. A method comprising:
introducing a downhole tool into a wellbore, wherein the downhole tool is a wellbore isolation device comprising at least one component selected from the group consisting of a mandrel, a packer element, a wedge, a slip, a mule shoe, a wiper element, a wiper body, and any combination thereof; wherein the component comprises a degradable non-metallic material that degrades upon exposure to a wellbore environment; and wherein the degradable non-metallic material is a composite material comprising a non-epoxy matrix material and a reinforcing material; wherein the non-epoxy matrix material is selected from the group consisting of: a thiol-based polymer; a hyaluronic acid rubber; a polyethylene terephthalate polymer; a polybutylene succinate polymer; a polyhydroxy alkanoic acid polymer; a polybutylene terephthalate polymer; a polyepichlorohydrin; a copolymer of ethylene oxide/polyepichlorohydrin; a terpolymer of epichlorohydrin/ethylene oxide/allyl glycidyl ether; copolymers thereof; terpolymers thereof; and any combination thereof; wherein the reinforcing material is a fiber material selected from the group consisting of carbon black, graphene, fullerene, a silica fibers, natural fibers, and any combination thereof; wherein the fiber material is treated with a silane-, siloxane-, or amine-based coupling agent;

anchoring the downhole tool within the wellbore at a target location;

performing at least one downhole operation; and degrading the degradable non-metallic material upon exposure to a wellbore environment.

11. The method of claim 10, further comprising a second reinforcing material that is a particulate material selected from the group consisting of organophilic clay, silica flour, metal oxide, silicates, aluminosilicates, carbon, sand, bauxite, ceramic materials, silicon carbide, alumina, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, minerals, composite particulates, and any combination thereof.

12. The method of claim 10, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable metal material.

13. The method of claim 10, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the degradable non-metallic material is a first degradable non-metallic material; wherein the second component comprises a second degradable non-metallic material; wherein the second degradable non-metallic material is a non-composite material.

14. The method of claim 10, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable glass material.

15. A system comprising:
a conveyance connected to a service rig and extending through a surface into a wellbore in a subterranean formation; and
a downhole tool connected to the conveyance and placed in the wellbore, wherein the downhole tool is a wellbore isolation device comprising at least one component selected from the group consisting of a mandrel, a packer element, a wedge, a slip, a mule shoe, a wiper element, a wiper body, and any combination thereof; wherein the component comprises a degradable non-metallic material that degrades upon exposure to a wellbore environment; and wherein the degradable non-metallic material is a composite material comprising a non-epoxy matrix material and a reinforcing material; wherein the non-epoxy matrix material is selected from the group consisting of: a thiol-based polymer; a hyaluronic acid rubber; a polyethylene terephthalate polymer; a polybutylene succinate polymer; a polyhydroxy alkanoic acid polymer; a polybutylene terephthalate polymer; a polyepichlorohydrin; a copolymer of ethylene oxide/polyepichlorohydrin; a terpolymer of epichlorohydrin/ethylene oxide/allyl glycidyl ether;
copolymers thereof; terpolymers thereof; and any combination thereof; wherein the reinforcing material is a fiber material selected from the group consisting of carbon black, graphene, fullerene, a silica fibers, natural fibers, and any combination thereof; wherein the fiber material is treated with a silane-, siloxane-, or amine-based coupling agent.

16. The system of claim 15, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the second component comprises a degradable metal material.

17. The system of claim 15, wherein the component is a first component and wherein the wellbore isolation device comprises a second component selected from the group consisting of a mandrel, a packer element, a sealing ball, a wedge, a slip, a mule shoe, a wiper element, a wiper body, and any combination thereof; wherein the degradable non-metallic material is a first degradable non-metallic material; wherein the second component comprises a second degradable non-metallic material; wherein the second degradable non-metallic material is a non-composite material.

18. The system of claim 15, wherein the matrix material is an elastomer.

19. The system of claim 15, further comprising a second reinforcing material that is a particulate material selected from the group consisting of organophilic clay, silica flour, metal oxide, silicates, aluminosilicates, carbon, sand, bauxite, ceramic materials, silicon carbide, alumina, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, minerals, composite particulates, and any combination thereof.

20. The system of claim 15, wherein the fiber has a length-to-diameter ratio in excess of 5:1.

* * * * *